(12) United States Patent
Dayan

(10) Patent No.: US 8,248,636 B1
(45) Date of Patent: Aug. 21, 2012

(54) WYSIWYG PRINTING FOR WEB BASED APPLICATIONS

(75) Inventor: Tal Dayan, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 1396 days.

(21) Appl. No.: 11/648,344

(22) Filed: Dec. 29, 2006

(51) Int. Cl.
*G06F 3/12* (2006.01)
*G06F 15/16* (2006.01)

(52) U.S. Cl. ...................................... 358/1.15; 709/219

(58) Field of Classification Search ................. 358/1.15, 358/1.16, 1.13; 717/120; 706/247, 224; 709/206, 223, 219; 715/274, 733; 345/619, 345/650
See application file for complete search history.

(56) References Cited

U.S. PATENT DOCUMENTS

| | | | |
|---|---|---|---|
| 5,689,664 A | 11/1997 | Narayanan et al. | |
| 5,706,502 A * | 1/1998 | Foley et al. | 717/120 |
| 5,790,114 A | 8/1998 | Geaghan et al. | |
| 6,049,832 A | 4/2000 | Brim et al. | |
| 6,161,148 A | 12/2000 | Pratt et al. | |
| 6,266,058 B1 | 7/2001 | Meyer | |
| 6,297,819 B1 | 10/2001 | Furst | 345/329 |
| 6,363,398 B1 | 3/2002 | Andersen | |
| 6,434,598 B1 | 8/2002 | Gish | |
| 6,621,590 B1 * | 9/2003 | Livingston | 358/1.15 |
| 6,725,238 B1 * | 4/2004 | Auvenshine | 1/1 |
| 6,769,019 B2 | 7/2004 | Ferguson | |
| 6,804,705 B2 | 10/2004 | Greco et al. | 709/219 |
| 7,075,670 B1 * | 7/2006 | Koga | 358/1.15 |
| 7,114,128 B2 | 9/2006 | Koppolu et al. | |
| 7,120,785 B1 | 10/2006 | Bowers et al. | 713/1 |
| 7,137,072 B2 | 11/2006 | Bauer et al. | |
| 7,181,731 B2 | 2/2007 | Pace et al. | |
| 7,222,303 B2 | 5/2007 | Oren et al. | |
| 7,225,231 B2 | 5/2007 | Mendez | |
| 7,307,745 B2 * | 12/2007 | Tanaka | 358/1.15 |
| 7,337,441 B2 | 2/2008 | Felt et al. | |
| 7,406,664 B1 | 7/2008 | Morton et al. | |
| 7,444,620 B2 | 10/2008 | Marvin | |
| 7,451,163 B2 | 11/2008 | Selman et al. | |
| 7,596,611 B1 | 9/2009 | Satish et al. | |
| 7,739,411 B2 | 6/2010 | Messer et al. | |
| 7,792,792 B2 | 9/2010 | Witriol et al. | |
| 7,903,277 B2 * | 3/2011 | Cudd et al. | 358/1.18 |
| 2001/0027474 A1 | 10/2001 | Nachman et al. | |
| 2002/0026507 A1 | 2/2002 | Sears et al. | |
| 2002/0078371 A1 | 6/2002 | Heilig et al. | |

(Continued)

OTHER PUBLICATIONS

Non-Final Office Action and Notice of References Cited for U.S. Appl. No. 11/648,524, dated Sep. 15, 2009, 13 pages.

(Continued)

*Primary Examiner* — Benny Q Tieu
*Assistant Examiner* — Sunil Chacko
(74) *Attorney, Agent, or Firm* — Sterne, Kessler, Goldstein & Fox PLLC

(57) ABSTRACT

A container application is a native application that allows a web based application to access a computer's system resources and windowing system. Web based applications are downloaded from application servers and run inside container applications. A web based application can alter or control many, or all, aspects of the container application's content area and meta user interfaces (UIs). Access to printer settings, display settings, and printer meta UIs provides a web based application with the capability to lay out or format printed documents. The newly provided capabilities include WYSIWYG capabilities.

13 Claims, 23 Drawing Sheets

U.S. PATENT DOCUMENTS

| | | | |
|---|---|---|---|
| 2003/0051236 | A1 | 3/2003 | Pace et al. |
| 2003/0192026 | A1 | 10/2003 | Szepesvary et al. |
| 2003/0236693 | A1 | 12/2003 | Chen et al. |
| 2004/0003034 | A1 | 1/2004 | Sun et al. |
| 2004/0017392 | A1 | 1/2004 | Welch |
| 2004/0019875 | A1 | 1/2004 | Welch |
| 2004/0031019 | A1 | 2/2004 | Lamanna et al. |
| 2004/0098733 | A1 | 5/2004 | Bjare et al. |
| 2004/0100501 | A1 | 5/2004 | Dornback |
| 2005/0024671 | A1* | 2/2005 | Abe .......................... 358/1.13 |
| 2005/0050472 | A1 | 3/2005 | Faseler et al. |
| 2005/0081165 | A1 | 4/2005 | Sobeski et al. |
| 2005/0083741 | A1 | 4/2005 | Chang et al. |
| 2005/0091664 | A1 | 4/2005 | Cook et al. |
| 2005/0203884 | A1 | 9/2005 | Allen et al. |
| 2005/0246453 | A1 | 11/2005 | Erlingsson et al. |
| 2005/0246718 | A1 | 11/2005 | Erlingsson et al. |
| 2006/0037030 | A1 | 2/2006 | Kovachka-Dimitrova et al. |
| 2006/0242663 | A1 | 10/2006 | Gogerty |
| 2007/0083924 | A1 | 4/2007 | Lu |
| 2007/0136579 | A1 | 6/2007 | Levy et al. |
| 2007/0192329 | A1 | 8/2007 | Croft et al. |
| 2007/0203944 | A1 | 8/2007 | Batra et al. |
| 2007/0288599 | A1 | 12/2007 | Saul et al. |
| 2008/0091777 | A1 | 4/2008 | Carlos |
| 2008/0313282 | A1 | 12/2008 | Warila et al. |

OTHER PUBLICATIONS

Non-Final Office Action and Notice of References Cited for U.S. Appl. No. 11/647,724, dated Dec. 11, 2009, 21 pages.

Final Office Action and Notice of References Cited for U.S. Appl. No. 11/648,324, dated Oct. 20, 2009, 18 pages.

"WebDevelopernotes.com—scrollbar colors—color code html scrollbar—change color html scrollbar", WebDevelopernotes.com, http://web.archive.org/web/20050529024157/http://www.webdevelopersnotes.com/tips/html/scrollbar_colors_html_color_codes, May 2005, 3 pages.

Non-Final Office Action and Notice of References Cited for U.S. Appl. No. 11/648,324, dated Jan. 19, 2010, 17 pages.

Tal Dayan, U.S. Appl. No. 11/330,854, filed Jan. 11, 2006, entitled "Web Based Native Applications".

Tal Dayan, U.S. Appl. No. 11/647,674, filed Dec. 29, 2006, entitled "Local Service Access Within a Web Based Application Framework".

Tal Dayan, U.S. Appl. No. 11/647,723, filed Dec. 29, 2006, entitled "Container Services".

Tal Dayan, U.S. Appl. No. 11/647,724, filed Dec. 29, 2006, entitled "Message Passing Within a Web Based Application Framework ".

Tal Dayan, U.S. Appl. No. 11/648,324, filed Dec. 29, 2006, entitled "Ubiquitous Services".

Tal Dayan, U.S. Appl. No. 11/648,363, filed Dec. 29, 2006, entitled "Collaborative Web Based Applications".

Tal Dayan, U.S. Appl. No. 11/648,524, filed Dec. 29, 2006, entitled "Local Storage for Web Based Native Applications".

Non-Final Office Action and Notice of References Cited for U.S. Appl. No. 11/647,724, dated Nov. 21, 2008, 24 pages.

Non-Final Office Action and Notice of References Cited for U.S. Appl. No. 11/648,324, dated Apr. 24, 2009, 17 pages.

Non-Final Office Action and Notice of References Cited for U.S. Appl. No. 11/330,854 dated May 26, 2009, 16 pages.

Microsoft Windows XP Task Manager Screen Shot. 1 page. Microsoft Windows XP Version 2002.

Final Office Action and Notice of References Cited for U.S. Appl. No. 11/647,724, dated Jun. 25, 2009, 28 pages.

Non-Final Office Action and Notice of References Cited for U.S. Appl. No. 11/647,674, dated Jun. 25, 2009, 11 pages.

Non-Final Office Action and Notice of References Cited for U.S. Appl. No. 11/647,723, dated Jun. 25, 2009, 11 pages.

Advisory Action for U.S. Appl. No. 11/330,854, mailed Jun. 3, 2010, 3 pages.

Final Office Action for U.S. Appl. No. 11/330,854, dated Mar. 16, 2010, 19 pages.

Final Office Action for U.S. Appl. No. 11/647,674, dated Jan. 27, 2010, 12 pages.

Final Office Action for U.S. Appl. No. 11/647,723, dated Jan. 27, 2010, 13 pages.

Final Office Action for U.S. Appl. No. 11/648,524, dated Mar. 26, 2010, 20 pages.

Non-Final Office Action for U.S. Appl. No. 11/648,524, dated Aug. 4, 2010, 19 pages.

Notice of Allowance for U.S. Appl. No. 11/648,524, received Jan. 5, 2011, 13 pages.

Final Office Action for U.S. Appl. No. 11/647,724, dated Aug. 4, 2010, 22 pages.

Non-Final Office Action for U.S. Appl. No. 11/647,724, dated Sep. 27, 2011, 30 pages.

Final Office Action for U.S. Appl. No. 11/648,324, dated Aug. 17, 2010, 14 pages.

Final Office Action for U.S. Appl. No. 11/648,324, dated Nov. 28, 2011, 14 pages.

Non-Final Office Action for U.S. Appl. No. 11/648,363, dated Sep. 17, 2010, 7 pages.

Non-Final Office Action for U.S. Appl. No. 11/648,363, dated Dec. 20, 2011, 8 pages.

Koers, Diane, "Microsoft Windows XP fast&easy," Premier Press, Inc., 2002, 3 pages.

Final Office Action for U.S. Appl. No. 11/648,363, dated Jun. 18, 2012, 7 pages.

Non-Final Office Action for U.S. Appl. No. 11/647,723, dated Jun. 25, 2012, 16 pages.

Non-Final Office Action for U.S. Appl. No. 11/647,674, dated Jul. 2, 2012, 15 pages.

* cited by examiner

WYSIWYG PRINTING FOR WEB BASED APPLICATIONS

TECHNICAL FIELD

Embodiments relate to the fields of computer applications, windowing applications, and graphical user interfaces. Embodiments also relate to the fields of computer networks, web based applications, and web browsers.

BACKGROUND

Networked computing environments enable users to access computing resources, data, and applications that are available on the computer network. In comparison, a non-networked environment allows users to access only the local computer and what the local computer has to offer. Current technology provides two ways for users to access applications over a network. A user can download an application from a server, install it on a computer, and then run it as a native application. A user can launch a web browser on a computer and use a locator, such as a uniform resource locator (URL), to download a browser application into the web browser and then run the browser application inside the web browser.

A web browser is a type of native application that runs on a computer. A native application can access a computer's system resources, such as hard drives, and peripherals. A computer with a windowing system can provide native applications with display windows and graphics capabilities. A web browser uses the windowing system to present browser windows to a user. A browser window has a meta UI area and a content area. The meta UI area contains controls, such as icons, menus, and text boxes, for controlling the web browser. The content area is used for web pages. For example, a browser application uses the content area to present information and accept input.

FIG. 22, labeled as "prior art", illustrates a high level block diagram of a web browser 2201 interacting with a server 2211. When a user launches a web browser 2201, setup and configuration 2208 data is used to set the web browser's initial appearance and status. Also at startup, the web browser's meta UI elements are initialized. A meta UI title bar control 2203 sets the web browser's title bar. A meta UI tool bar control 2206 sets the web browser's tool bar. A meta UI menu control 2207 sets the web browser's menu bar and menus. A meta UI task bar control 2202 interfaces with the windowing system's task bar. A meta UI control 2204 can set other meta UI elements. The web browser's content area control 2209 displays the content area control obtained from the server 2211. The server's security 2213 and the web browser's security 2205 interact to ensure privacy and authenticity.

A browser application is different from a browser extension (also called a browser plug-in). A browser application is accessed on a server and uses the browser's content area for interacting with a user. A browser extension is obtained and then installed as part of the web browser. After installation, the browser extension and the web browser are both part of the same native application running on the computer. A browser extension can control the web browser's meta UI area because it is part of the browser. Furthermore, a browser extension has the same access to a computer's resources that the browser has because they use the same entry points.

A native application can store data in a computer's non-volatile memory. Web browsers make use of this capability by storing cookies and storing downloaded web pages onto the hard drive. Browser applications, however, have very limited access to the computer's non-volatile storage but can compensate by storing persistent data on a remote server. For example, a cookie on the computer can identify the user and thereby be used to access the users profile on a web site. As such, browser applications or server side applications can access data on a server.

Native applications can set window titles and can set the appearance of task bar icons. Browsers can set window titles and task bar icons to indicate the content currently within a browser window. Browser applications, however, can not set window titles and can not change the appearance of task bar icons.

Client/server applications are applications that often make extensive use of server side computing resources. The client side of the application is a native application the presents a user interface on the client computer's display. The client application then accepts user inputs and sends them to a server application. The server application processes the input and sends a response to the client application. The client application then updates the user interface based on the server's response.

When displaying a web page, a web browser lays out the web page in conformance with the display and with the window size. When printing a web page, the web browser lays out the page in conformance with the printer and the page size. The result is that a web page can have a different layout on different computers, different displays, and different printers. This generality in formatting pages to meet the constraints of presentation devices is a hallmark of the world wide web. Some users, however, desire a "what you see is what you get" (WYSIWYG) printing capability. As such, systems and methods for improving the user's experience are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

Limitations in current technology can be addressed by providing a container application that allows web based applications to access printer settings, display settings, or printer meta UIs.

It is therefore an aspect of the embodiments to run a container application on a computer. The container application obtains a web based application from an application server. The web based application is then run inside the container application.

It is also an aspect of the embodiments that the web based application has, accesses, or produces web based application content. A layout module lays out the web based application content to produce a displayed document.

It is a further aspect of the embodiments to provide printer settings. The layout module uses the printer settings to produce the displayed document. The printer settings are used to ensure that the printer can produce a printed document that looks substantially the same as the displayed document. The documents look substantially the same though minor differences, such as fonts appearing slightly different, may occur because printers and displays are not identical.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Overview

A container application is a native application that allows a web based application to access a computer's system resources and windowing system. Web based applications are downloaded from application servers and run inside container applications. A web based application can alter or control many, or all, aspects of the container application's content area and meta user interfaces (UIs). Access to printer settings, display settings, and printer meta UIs provides a web based application with the capability to lay out or format printed documents. The newly provided capabilities include WYSIWG capabilities.

Architectural Overview

Figure 1:
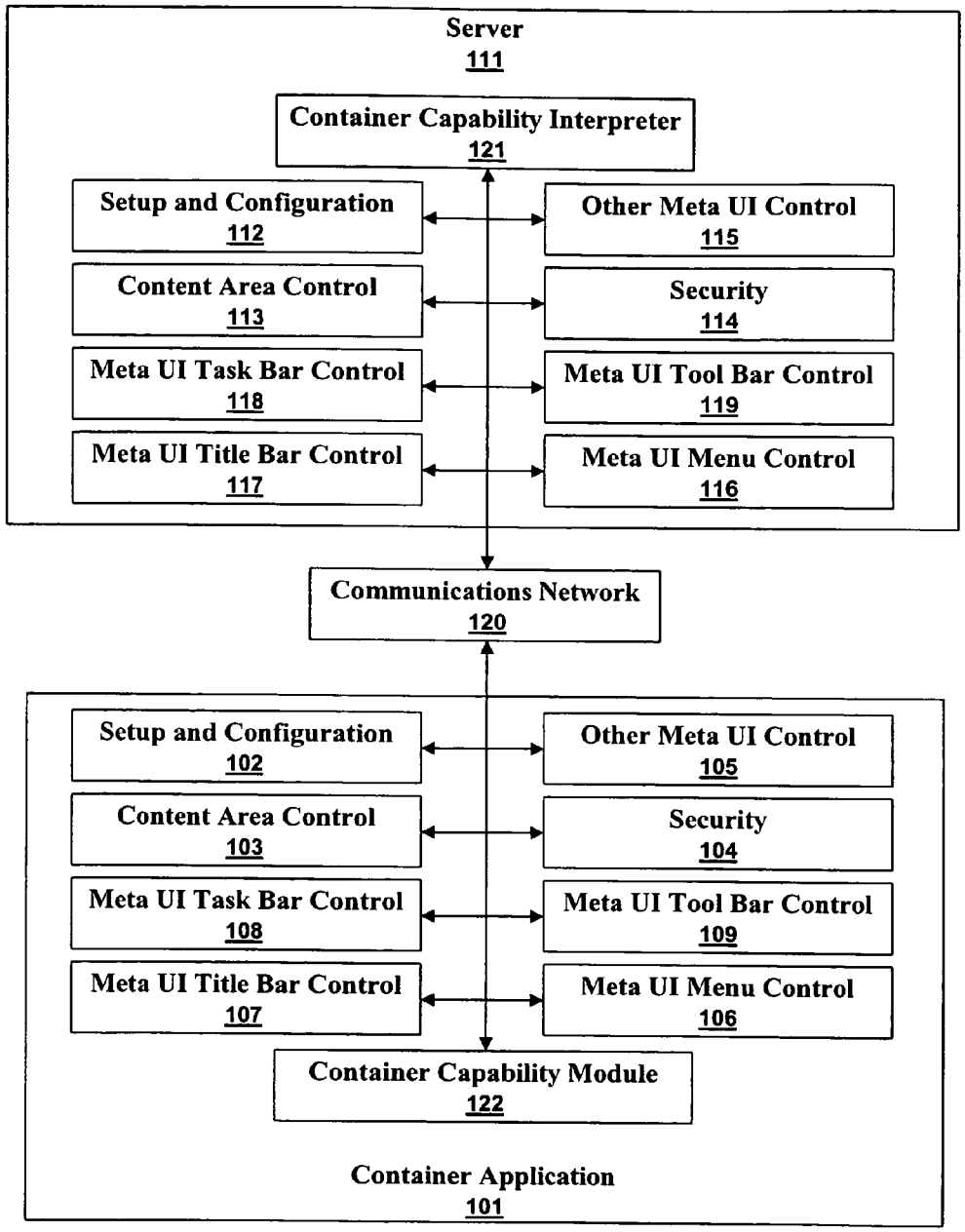
FIG. 1 illustrates a container application running and interacting with a web based application hosted by a server in accordance with aspects of the embodiments.
Figure 22:
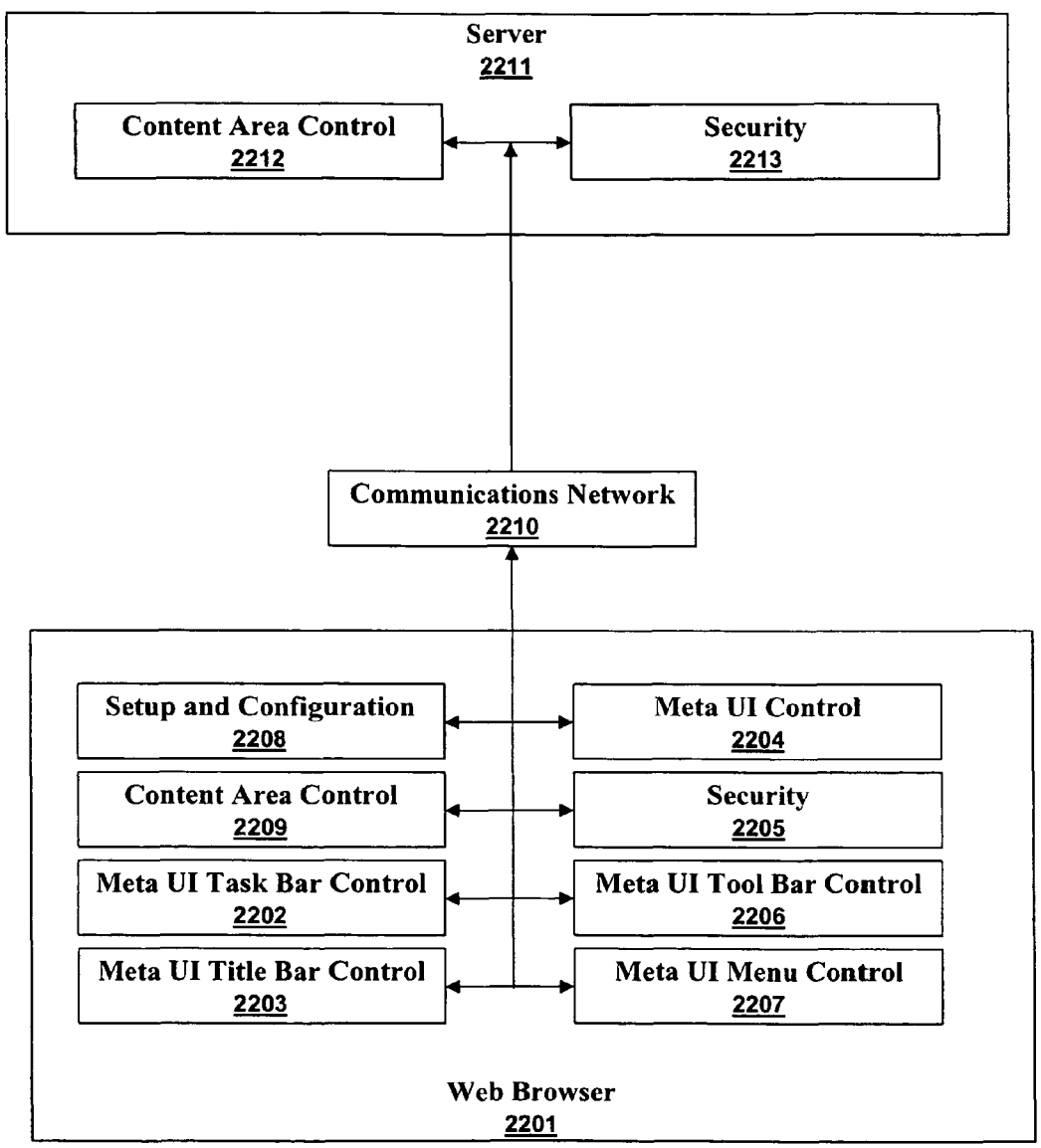
FIG. 22, labeled as "prior art", illustrates a high level block diagram of a web browser interacting with a server.

FIG. 1 illustrates a container application 101 running and interacting with a web based application hosted by a server 111 in accordance with aspects of the embodiments. The container application 101 has a setup and configuration module 102 that initializes the container application 101 for use based on information obtained from the server setup and configuration module 112. The container application content area control module 103 and the server content area control module 113 can be functionally similar to those of the browser application of FIG. 22.

The container application meta UI elements can be controlled and altered by corresponding elements on the server. The container application meta UI task bar control module 108 communicates with the server meta UI task bar control module 118 and controls the task label that is presented in the task bar. The container application meta UI title bar control module 107 communicates with the server meta UI title bar control module 117 and controls the title that is presented in the container application's window. The container application meta UI tool bar control module 109 communicates with the server meta UI tool bar control module 119 and controls the presentation and use of tool icons in the container application's window. The container application meta UI menu control module 106 communicates with the server meta UI menu control module 116 and controls the presentation and use of menus in the container application's window. The container application other meta UI control module 105 communicates with the server other meta UI control module 115 and controls other meta UI elements. Embodiments can allow multiple meta UI elements to communicate with the server at the same time. For example, a single web page sent from the server to the container application may include settings or control of multiple UI elements of the container application. The modules, such as the setup and configuration modules 102, 112 and the meta UI control modules can be implemented in a variety of ways. Among the variety of ways are programming code written in a programming language such as javascript and data that can be formatted using a markup language such as XML.

Different container applications can have different capabilities. The container application 101 can have a container capability module 122 for communicating those capabilities. The server 111 can have a container capability interpreter 121. As such, the server 111 can control those elements that the container application 101 advertises as present and controllable. In more advanced implementations, the container application and the server can cooperate to discover how the server can control the container application's meta UI elements.

The client security module 104 and the server security module 114 can ensure authenticity and privacy. Privacy can be obtained by creating a secure channel through the communications network 120. Authenticity can mean verifying the identity of the server, client, and source of downloadable elements or control elements. For example, a secure server hosting a web application can ensure that no third party is pretending to be the secure server. The third party, however, can break into the secure server and place bogus elements such as text and CGI scripts onto the server. CGI scripts are control elements that run on the server. The server side meta UI controls also act as control elements for the container application meta UI controls. Authentication can be done in both sides. For example, since the container application gives the server some control over the user desktop by modifying the meta UIs, the container application needs to make sure that the server is authenticated and that it is authorized, perhaps explicitly by the user, to use the extra capabilities.

Container application 101 meta UIs that are altered by corresponding elements on the server 111 are not necessarily rewritten fully or partially. For example, when first launched, one of the container application's menus can have five selections. After a web based application is accessed and the container application is configured, that menu can contain 12 selections including the original five. If the web based application is completely unloaded, then that menu reverts to containing only the original five selections.

Web based applications can be launched in a variety of ways. An application launch icon on the desktop can be associated with the web based application. Opening the application launch icon can cause the container application to launch, download a first web based application, and run it, while opening a different application launch icon can cause the container application to launch, download a second web based application, and run it. Similarly dragging and dropping a file onto the application launch icon can cause the web application to launch and load information or settings from the dropped file. A file can be associated with a web based application, perhaps by file type or file extension. Opening the file can cause the web based application to launch and load the file. A web link on a web page can be associated with a web based application or application type. Selecting the web link can cause the web based application to launch. For example, imagine a web based email application called GmailPrime. GmailPrime has an application type identifying it as an email application. Clicking on a web link associated with the email application type could cause GmailPrime to launch. In another example, one web application can launch another web application or cause the same application container window to switch to another web based application using javascript code, HTML tags, or XML tags.

The word "launch" means "to begin running". An operating system can launch a service by beginning to run it as it would run any other program. A container application can similarly launch a web based application. The difference is that a web based application runs inside a container application. As such, the operating system need not be aware that a web based application is running inside the container application. The operating system, or windowing system, can launch a web based application by launching the container application such that the container application is supplied with information, such as a URL, specifying a web based application to download and run.

Figure 2:
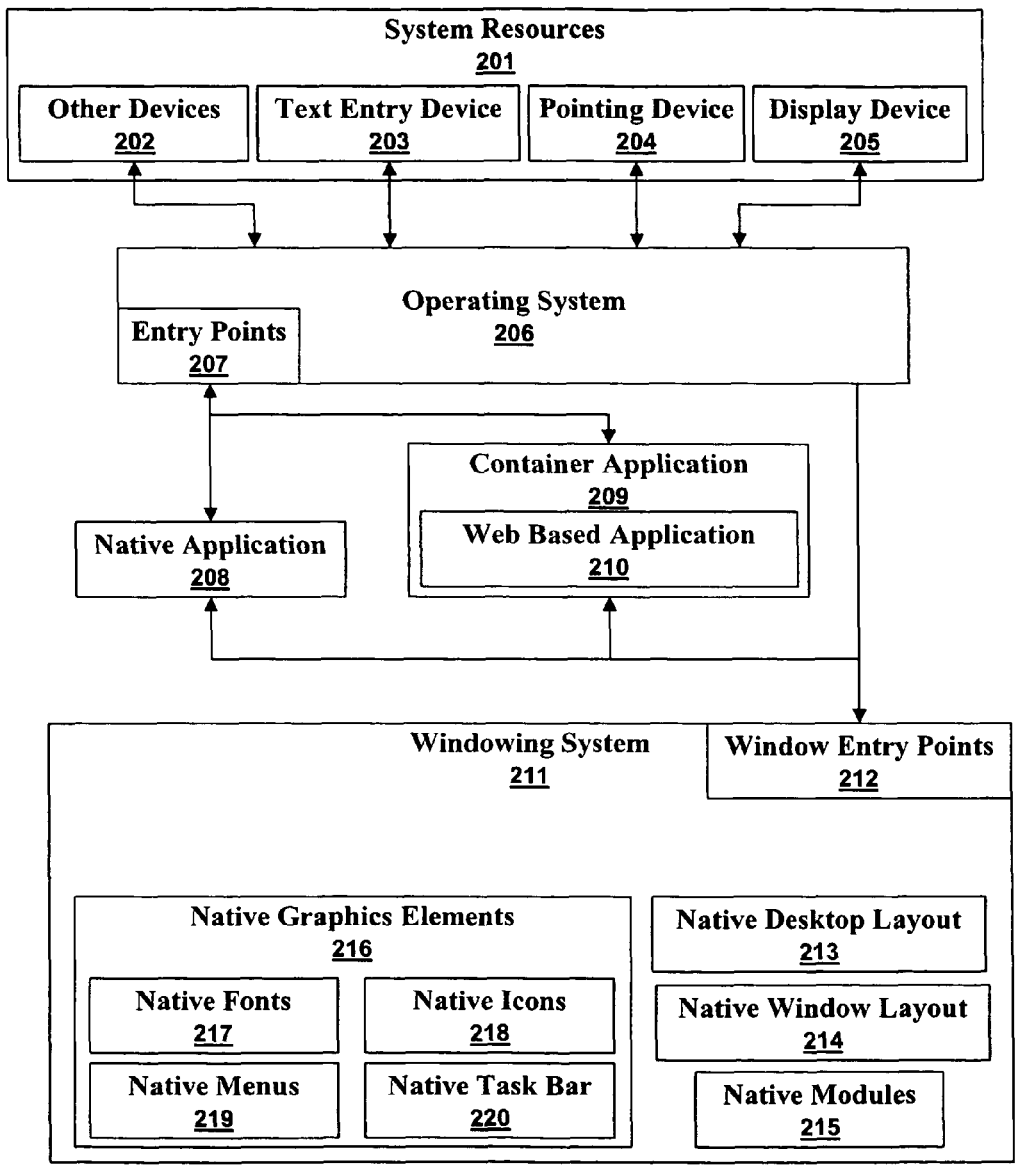
FIG. 2 illustrates a container application in a computing environment in accordance with aspects of the embodiments.

FIG. 2 illustrates a container application 209 in a computing environment in accordance with aspects of the embodiments. A computing environment can contain system resources 201, an operating system 206, a windowing system 211, and native applications 208. System resources 201 can be text entry devices 203, pointing devices 204, display devices 205, and other devices 202 such as hard drives or audio devices. The operating system 206 uses the system resources 201 and also gives native applications 208 and container application 209 controlled access to the system resources 201. Access is typically provided and controlled using entry points 207. A native application 208 can use entry points 207 to access the system resources 201 while the operating system 206 determines the level of access to allow.

A windowing system 211 is used to present graphics on a display device. The windowing system has native graphics elements 216 such as native fonts 217, native icons 218, native menus 219, and a native task bar 220. The display device often presents a desktop with windows, icons, and a task bar. A native desktop layout 213 determines the desktop appearance. The native window layout 214 determines a default layout for windows. The windowing system 211 also contains other native modules 215. A native application 208 or container application 209 can access the windowing system resources by way of window entry points 212.

A native application 208 does not have to be associated with a window. It can be run by the computer without an interface appearing on the display device. As such, a web based application can be run by a container application without any interface appearing on the display device because the container application is a type of native application. In this case, the web based application has access to the operating system 206 and windowing system 211, but does not necessarily display anything. The web based application therefore appears to be a background process, system process, or service. Processes, such as web servers, mail servers, compute servers, and database engines are often run in the background, as services, or as system processes.

A container application 209 is a type of native application that can download and run a web based application 210. The web based application 210 runs inside the container application and as such the container application 209 provides the web based application 210 with access to the entry points 207 and window entry points 212.

Figure 3:
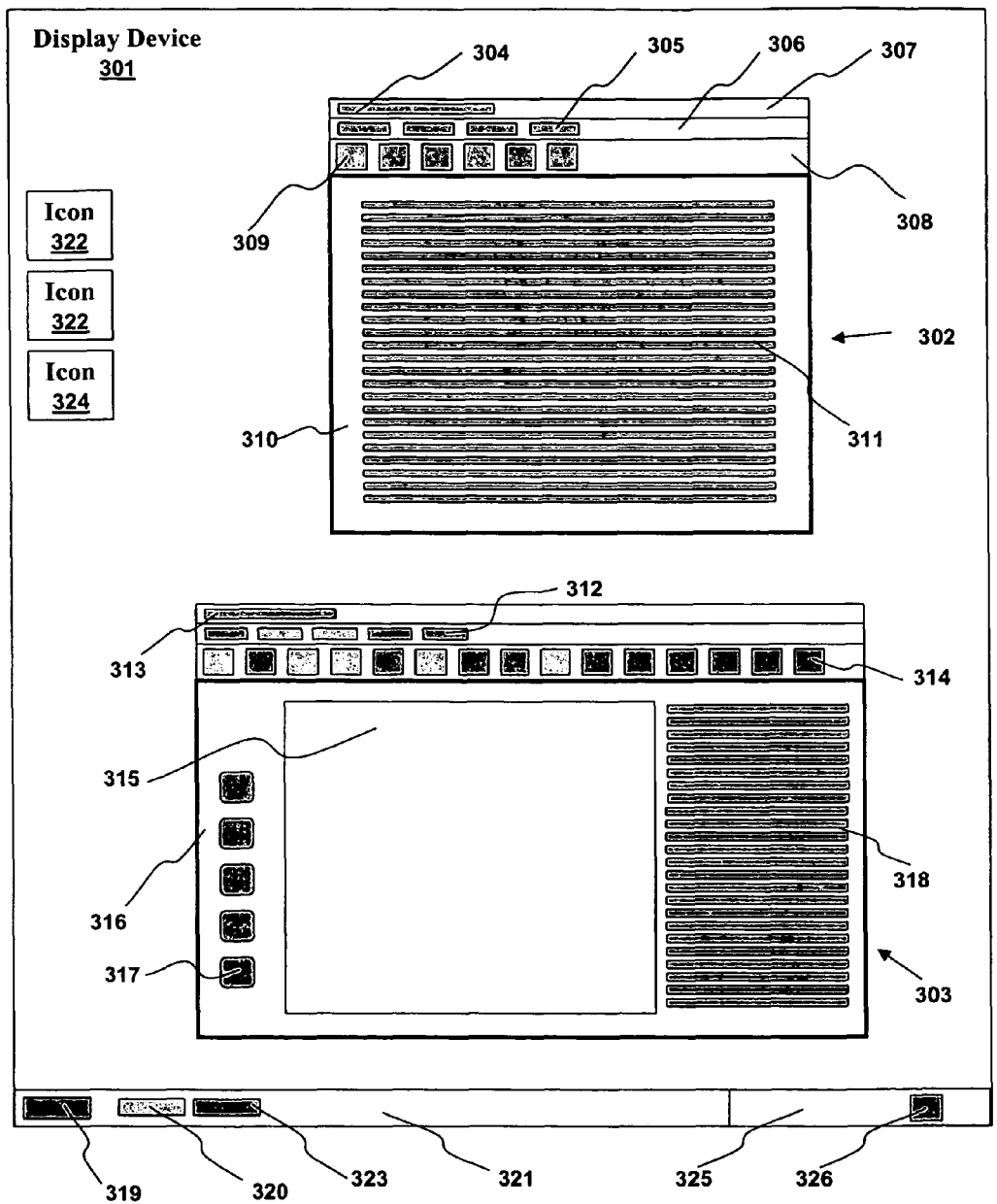
FIG. 3 illustrates a display device with windows and icons in accordance with aspects of certain embodiments.

FIG. 3 illustrates a display device 301 with windows 302, 303 and icons 322 in accordance with aspects of certain embodiments. The top window 302 is associated with a native application that is not a container application. For example, the top window 302 can be associated with a web browser.

The top window 302 has a title 304 that is set by the native application. The top window 302 has a menu bar 306 containing menus 305 that are set by the native application, often in accordance with a design guideline or default window layout. A tool bar 308 containing tool icons 309 is set by the native application in a manner similar to the menu bar 306 and menus 305. A content area 310 is illustrated as containing lines of text 311 although native applications can place any sort of graphic in the content area 310. If the native application is a web browser, a web page can be presented in the content area 310.

The lower window 303 is associated with a container application running a web based application. The title 313 is set by the web based application. As such, the title is illustrated as a darker shade of gray to indicate that it has been set by the web based application. The container application has a tool bar and a menu bar similar to those of the top window 302 with the exception of containing meta UIs set by the web based application. A darker gray shading indicates meta UIs set by the web based application such as menu 312 and tool icon 314. The content area 316 can contain icons 317, images 315, and text 318.

A task bar 321 is shown at the bottom of the screen containing task bar icons. A first task bar icon 319 can be used to call up a default menu that, as illustrated, has been modified by the web based application, perhaps by adding menu items. For example, a web based application can alter the "Start" menu of a computer running the Microsoft Windows™ operating system. A second task bar icon 320 is associated with the top window 302 and native application. A third task bar icon 323 is associated with the lower window 303 and container application. As indicated by the shading, the third task bar icon 323 has been set by the web based application. For example, a task bar icon can contain "Container" for an empty container application but contain "Patent Drafter" when a web based application for patent drafting is running in the container application. A system tray 325 can contain system tray icons corresponding to services that are running on the computer but do not have a window. A system tray icon 326 is illustrated as corresponding to a web based application running as a service. A web based application can run as a service when it is run inside a container application that does not have a window.

Desktop icons 322, 324 can be used for launching native applications. Using a pointing device to "open" a desktop icon can cause the associated native application to launch. A desktop icon 324 can also be associated with a web based application. Opening the desktop icon 324 causes the container application to launch, obtain the associated web based application, and begin running the web based application.

Figure 4:
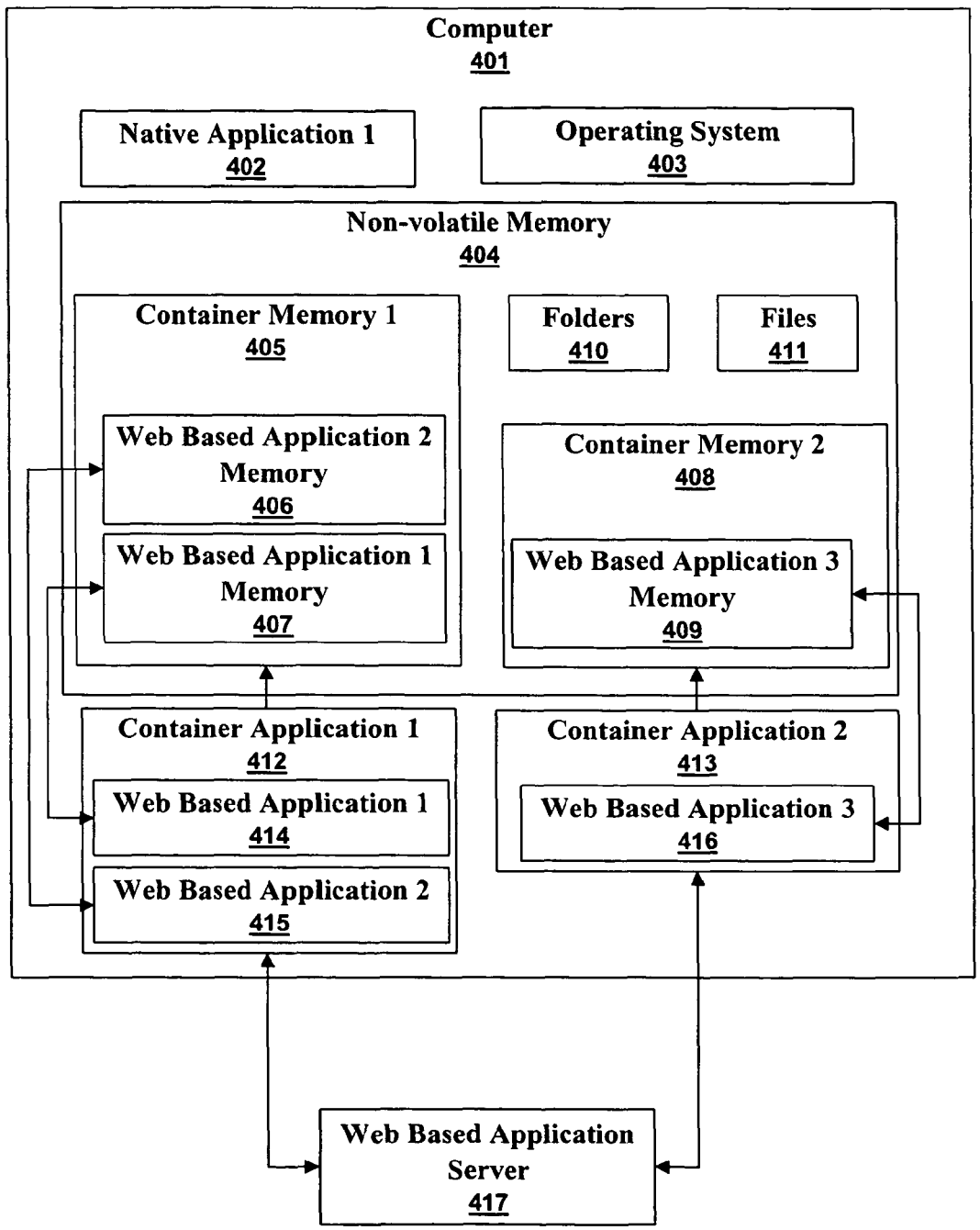
FIG. 4 illustrates a high level diagram of running a web based application in accordance with aspects of the embodiments.

FIG. 4 illustrates a high level diagram of running web based application in accordance with aspects of the embodiments. A computer 401 typically runs processes associated with the operating system 403 and native applications 402. The computer 401 can also run container applications 412, 413. The first container application 412 is running two web based applications 414, 415 the second container applications is running one web based application 416.

The computer 401 typically has non-volatile memory 404 such as a hard drive or flash memory device. The non-volatile memory 404 typically contains folders 410 and files 411 and other data. The non-volatile memory 404 can also contain container memories 405, 408. The first container memory 405 contains a memory area 407 for the first web based application 414 and a memory area 406 for the second web based application 415. The second container memory 408 contains a memory area 409 for the third web based application 416. The web based applications 414-416 can be obtained from an application server such as the web based application server 417.

The container memories 405, 408 are illustrated as separate because neither container application can access the others memory, although well known memory sharing methods and systems can be used such that all the container applications can access a shared memory area. Similarly, the memory areas 406, 407 are illustrated as separate to indicate that the first and second web based applications 414, 415 can not access each others memory areas. A shared memory can be used by both web based applications 414, 415 in which case either can access the others memory.

Figure 5:
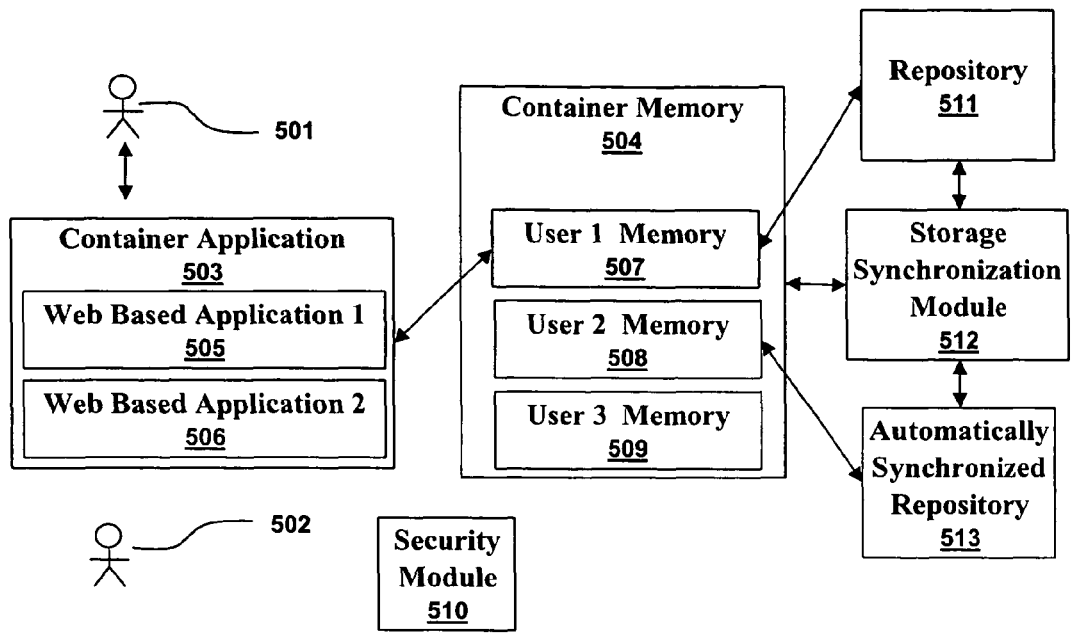
FIG. 5 illustrates web based applications being shared by users with a backup capability in accordance with aspects of the embodiments.

FIG. 5 illustrates web based applications 505, 506 being shared by users with a backup capability. A first user 501 is using a container application 503 to run a first web based application 505 and a second web based application 506. A second user 502 is doing something else. The container application 503 has a container memory 504 containing separate memories for different users. The first user 501 uses the first user memory 507. The second user 502 uses the second user memory 508. The third user memory 509 is used by someone else. A security module 510 can ensure that one user does not access another user's memory.

A storage synchronization module 512 can backup data from the container memory 504 to a repository 511. The specific backup policy can be a per user policy, per application policy or a combination. Here, a per-user policy is illustrated. The first user memory 507 is backed up into the repository 511 whenever the first user 501 desires. The second user memory 508 is automatically backed up into an automatically synchronized repository 513. A repository is often a remote backup facility into which data can be stored in case it needs recovery at a later time. Automatic synchronization occurs when the data is backed up automatically such as once per day, once per second, or whenever the data changes.

Figure 6:
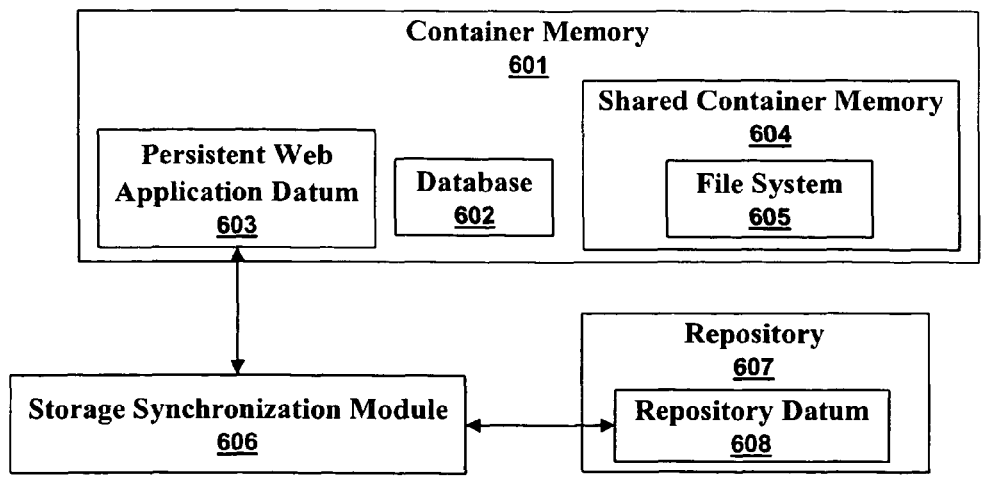
FIG. 6 illustrates a high level diagram of backing up container memory into a repository in accordance with aspects of the embodiments.

FIG. 6 illustrates a high level diagram of backing up container memory 601 into a repository 607. The container memory contains a database 602, a shared container memory 604, and a persistent web application datum 603. The shared container memory 604 contains a file system 605 that can be shared by any or all the web based applications that run inside a container application. A storage synchronization module 606 is shown synchronizing the persistent web application datum with a repository datum 608 in a repository 607. The database 602 and the file system 605 are also persistent because they are stored in a container memory 601 and thereby in a non-volatile memory.

Figure 7:
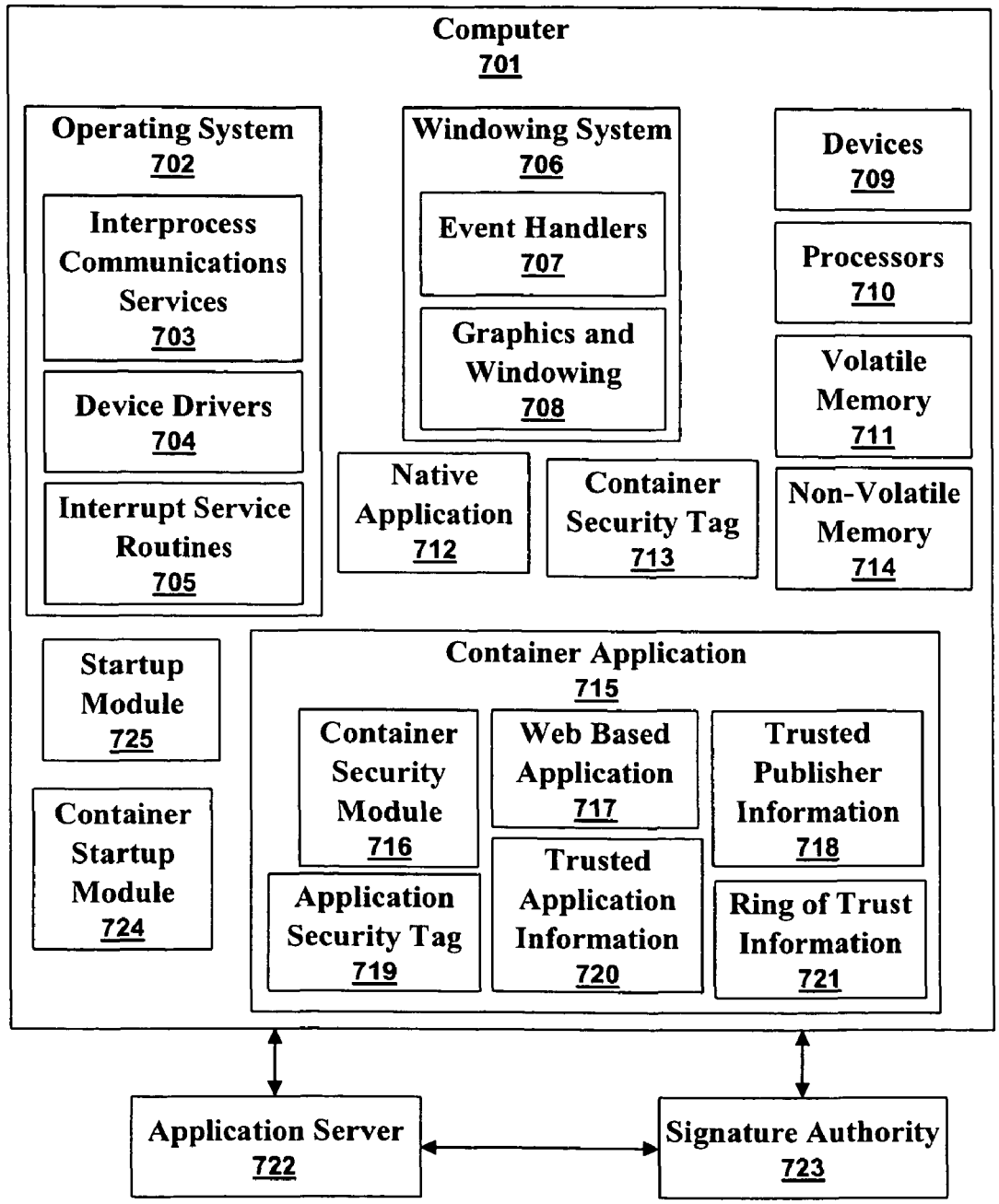
FIG. 7 illustrates a high level diagram of a computer using a container startup module to launch a container application in accordance with aspects of the embodiments.

FIG. 7 illustrates a high level diagram of a computer 701 using a container startup module 724 to launch a container application 715 in accordance with aspects of the embodiments. The computer 701 has hardware type system resources such as processors 710, volatile memory 711, and non-volatile memory 714. The computer can also have software type system resources such as an operating system 702 and a windowing system 706. The operating system can provide inter process communications services 703, device drivers 704, and interrupt service routines 705. The windowing system 706 provides event handlers 707 as well as graphics and windowing capabilities.

The computer 701 can run native applications 712 and container applications 715. The computer 701 can use a container security tag 713, such as a digital signature, for authenticating the container application. Authenticating is the process of ensuring that something has not been tampered with or comes from a trusted source. The container application can have a container security module 716. The container security module 716 can use an application security tag 719, trusted application information 720, trusted publisher information 718, or ring of trust information 721 to authenticate a web based application 717 or to determine an access level for the web based application 717.

The application security tag 719 can be used to verify that the web based application 717 has not been tampered with or comes from the proper source. The web based application 717 can be downloaded from any application server 722, especially when a signature authority 723 is used in the authentication process. Trusted application information 720 indicates the level of access to system resources and windowing system resources to grant the web based application 717. The source of a web based application 717 is the publisher. A trusted publisher is a publisher whose every web based application is a trusted application and the trusted publisher information 718 acts as the trusted application information 720 for all the publisher's web based applications. Trusted application information 720 can refine trusted publisher information on a per web based application 717 basis.

A ring of trust is a mechanism whereby trust is passed through a third party. For example, a user can indicate that every application trusted by a certain administrator is trusted and the user can set access information for that certain administrator's web based applications. That certain administrator can indicate that a particular service provider is trusted and the administrator sets access information for that particular service provider's web based applications. The user thereby trusts the service provider and the trust is passed by way of the administrator. The user can grant access to the service provider's web based applications based on the trust the user grants the administrator and the trust the administrator grants the service provider. In the example above, trust passed through a single third party. In reality, there can be very many third parties. The ring of trust information 721 contains information for passing trust via third parties. No trust can pass through third parties marked as untrusted.

The computer 701 contains a startup module 725 and a container startup module 724. The startup module 725 is run at boot time to initialize the computer 701 and to launch applications such as processes and services. The container startup module 724 can launch one or more instances of the container application 715 such that each instance automatically downloads and runs web based applications 717. As such, the container startup module can automatically create a user environment having the users favorite web based applications. The startup module 725 can run the container startup module 724 to automatically set up a user's environment at system startup time.

Figure 8:
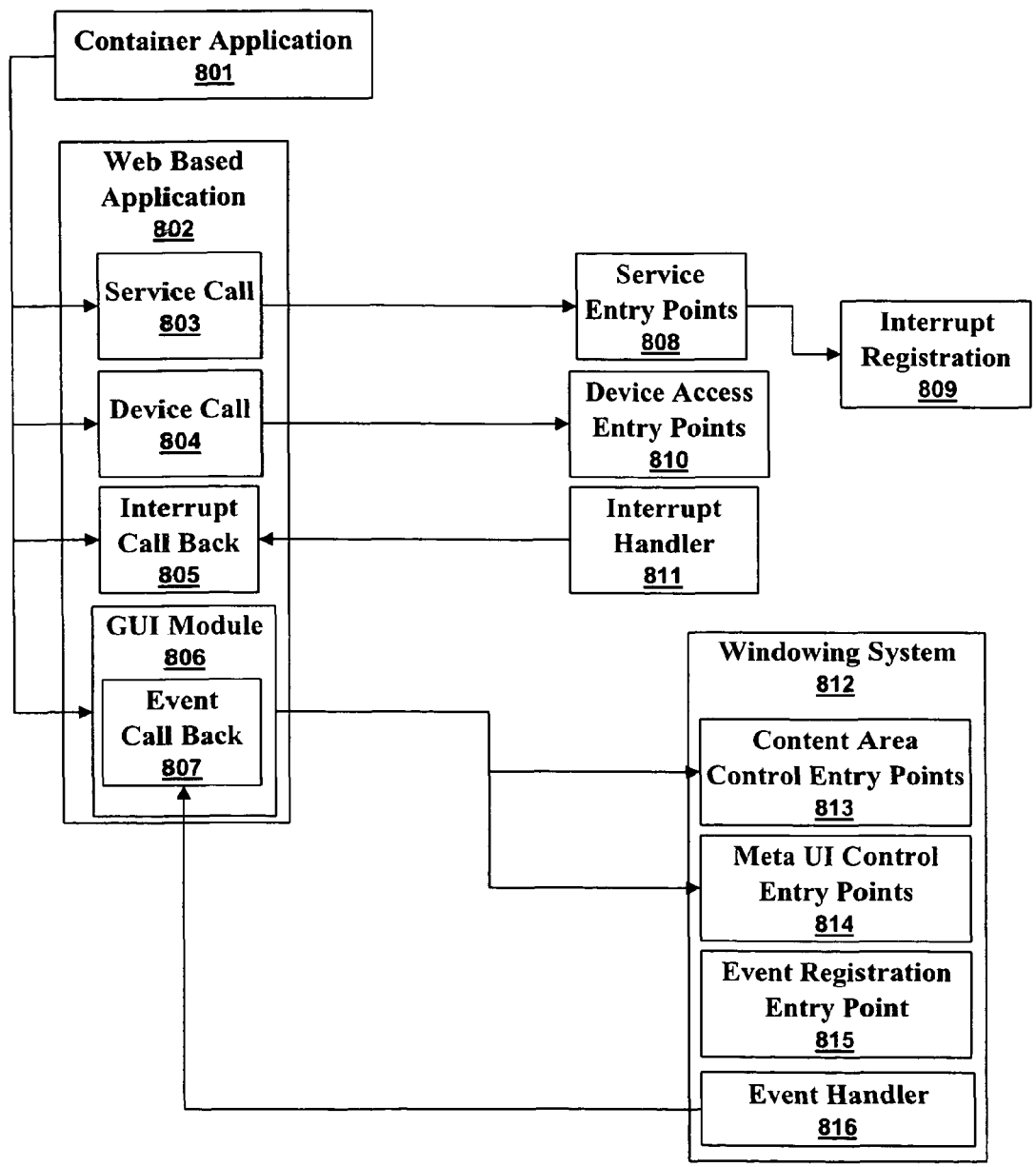
FIG. 8 illustrates a high level diagram of a web based application directly accessing system resources in accordance with aspects of the embodiments.

FIG. 8 illustrates a high level diagram of a web based application 802 directly accessing resources in accordance with aspects of the embodiments. The container application 801 can supply data to the web based application 802 indicating how to access system resources or windowing system resources. Alternatively, a web based application can use standardized entry points such as the POSIX standards for UNIX based systems. The web based application can call services 803 and call devices 804. Service calls are directed to service entry points 808 while device calls 804 are directed to device drivers or device access entry points 810.

Many operating systems provide an interrupt service. The web based application 802 can use an interrupt registration 809 service to register an interrupt call back 805 with the operating system. When an interrupt occurs, an interrupt handler 811 will call the interrupt call back if it is registered for that interrupt. Some interrupts are hardware interrupts that are caused by a device. Other interrupts are software interrupts where one program causes an interrupt and other programs can react to the interrupt.

The windowing system 812 also provides services. Content area control entry points 813 can provide the GUI module 806 with access to drawing, graphics, text, and windowing services. Meta UI control entry points 814 can provide access and control over meta UIs such as menus, menu bars, etc. An operating system has interrupts while a windowing system has events. In practice, interrupts and events are very similar because they can result in call backs. An interrupt call back is a call back for an interrupt while an event call back is a call back for an event. An event call back 807 can be registered through the event registration entry point 815. When an event, such as a mouse over event, occurs the event handler 816 calls the event call back 807 if it is registered for that event. In some cases, a program launch is registered for an event. As such, an event can cause a container application to be launched such that it downloads and runs a web based application.

A program launch can be registered for an interrupt call back as well as for an event call back. As with an event, an interrupt can cause a container application to be launched such that it immediately downloads and runs a web based application. The container application can be supplied with parameters or arguments specifying the web based application that is to be launched. The container application can also be supplied with parameters or arguments that are to be passed on to the web based application. All the parameters or arguments supplied to the container application can be part of the call back, can be specified as data in a file or database, can be specified within a startup script, or can be specified in some other manner.

A call back is essentially code executed in reaction to an event or interrupt. As discussed above, call backs can be functions, subroutines, methods, native programs, or other types of code. A native program type call back can be a container application supplied with parameters specifying a web based application and even arguments or parameters for the web based application. A call back can even result in messaging to separate processes or computers. Such messaging can include remote procedure calls, database inquiries, information lookup, object access, and any of the other facets of computing systems, architectures, or environments using message passing. Note that a computing environment can include many, perhaps thousands, of computers.

Figure 9:
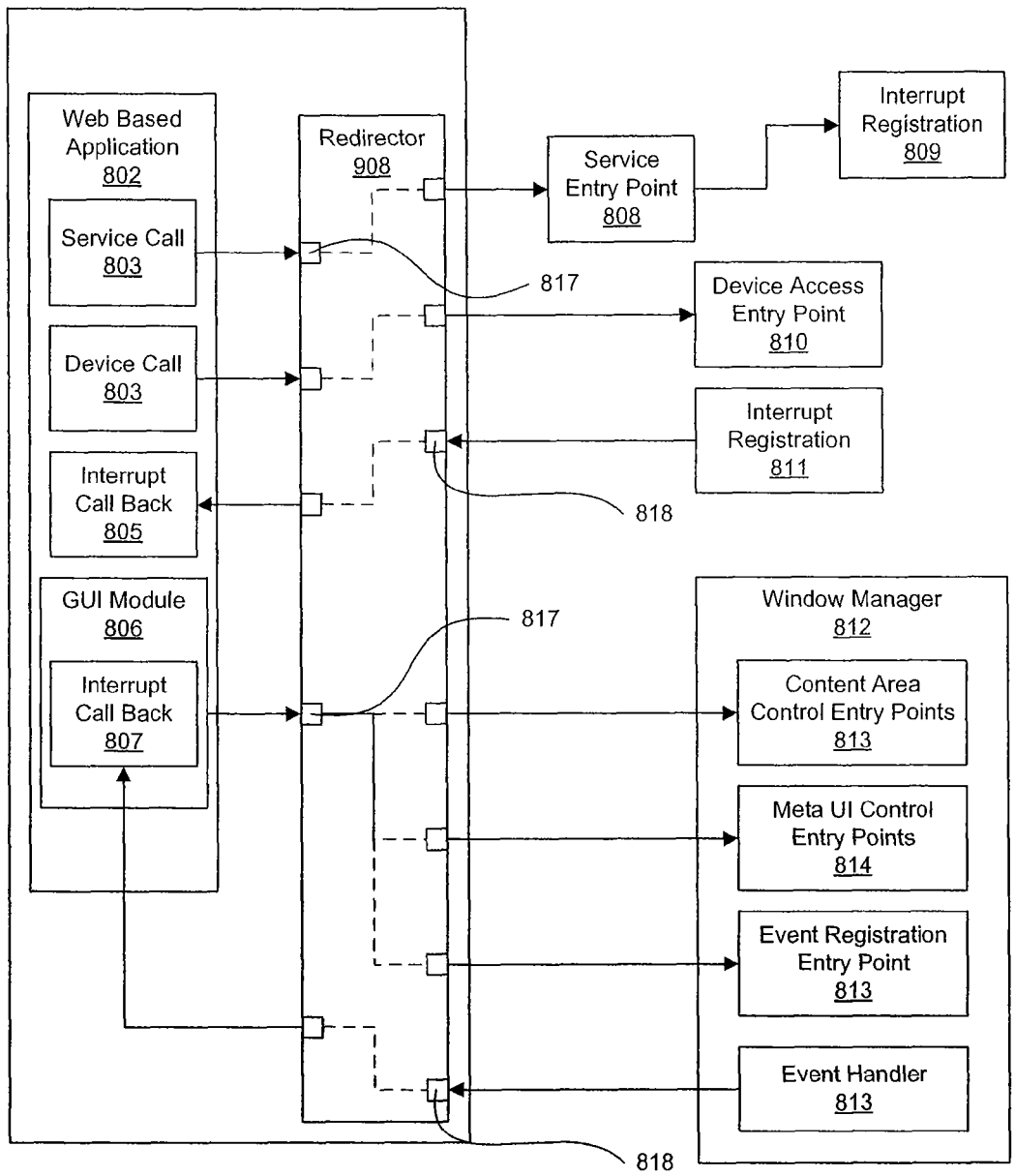
FIG. 9 illustrates a high level diagram of a web based application indirectly accessing system resources in accordance with aspects of the embodiments.

FIG. 9 illustrates a high level diagram of a web based application 802 indirectly accessing system resources in accordance with aspects of the embodiments. FIG. 9 is similar to FIG. 8 with the exception that the container application 901 uses a redirector 908 to provide the web based application 802 with redirected access to the system and window services. The web based application 802 calls redirected entry points 817 in the redirector 908 and the redirector 908 passes the call to the desired service entry point 899 808 or device access entry point 810. Similarly, the GUI module 806 calls redirected entry points 817 that are passed to the window manager 812. The web based application 802 registers interrupt call backs 805 and event call backs 807 with the redirector 908. The container application 901 registers container call backs 818 with the interrupt handler 811 and the event handler 816. As such, events and interrupts result in container call backs 818 to the redirector and the container call backs 818 are redirected back to the event call backs 807 and interrupt call backs 805 as required.

A redirector is one way of using access information, such as trusted application information, to limit access to system and windowing system services. In a direct access scenario, the container application can set information in the web based application. For example, the container application can supply entry points for directly reading a file, but not for writing to it.

Figure 10:
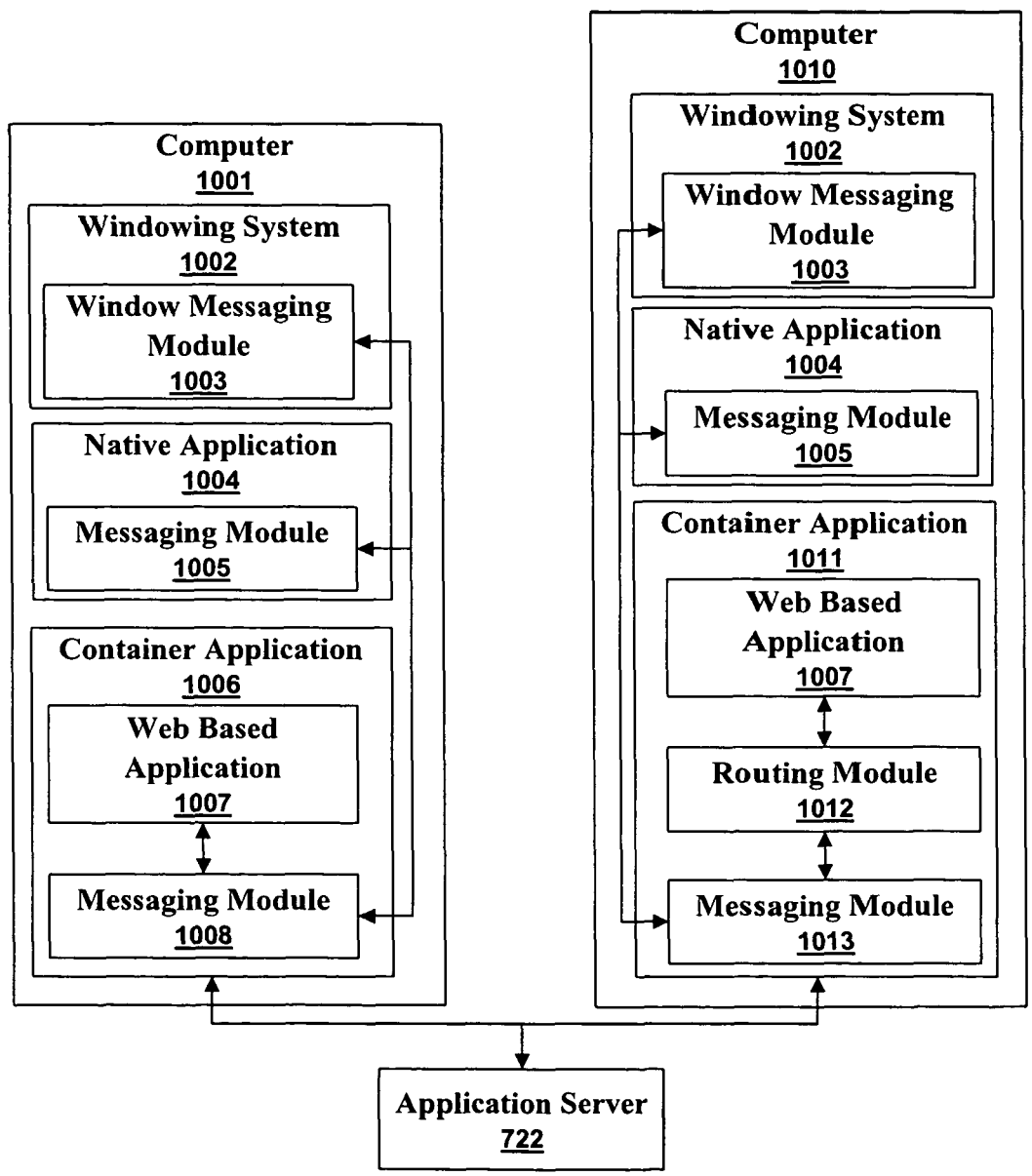
FIG. 10 illustrates a high level diagram of messaging amongst web based applications, native applications, and windowing systems in accordance with aspects of the embodiments.

FIG. 10 illustrates a high level diagram of messaging amongst web based applications, native applications, and windowing systems in accordance with aspects of the embodiments. Recall that a computer's operating system provides inter process communications services. Messaging is a common type of inter process communication. Many windowing systems 1002 and native applications also provide inter process communications services. In general, messaging means a general transfer of information and includes calling a function or getting a return value from a function, sending data, receiving data, and routing messages. Packets of data are a type of message that can be routed among subroutines, programs and computers. There are many constructs that are functionally equivalent to a function including synchronous procedures, asynchronous procedures, methods, subroutines. A windowing system 1002 can have a window messaging module 1003 and a native application 1004 can have a messaging module 1005. Calling a function can result in a data packet being sent to other functions, programs, or other computers. Sending a message can result in the message recipient launching a program or executing a function and, possibly, returning a message containing an error code or resultant value.

A container application 1006 can have a messaging module 1008 for use by a web based application 1007, although the web based application can contain its own messaging module. A container application 1011 can also have a routing module 1012 that controls the messages passed between a web based application 1007 and a messaging module 1013. The routing module 1012 can restrict which messages can be sent or received as well as intercepting and redirecting messages. A redirected message can be routed to a destination other than the intended one.

Messaging is simply the passing of data between computers, operating systems, windowing systems, and applications. For example, the drag and drop capability can use messaging. First, data or a graphic representing the data is selected to form the message. The selection is then drug to a drop point or insertion point at which time the windowing system passes the message to the underlying application or service. The underlying application or service then uses the data to insert text, insert graphics, launch an application, or whatever action is appropriate.

Figure 11:
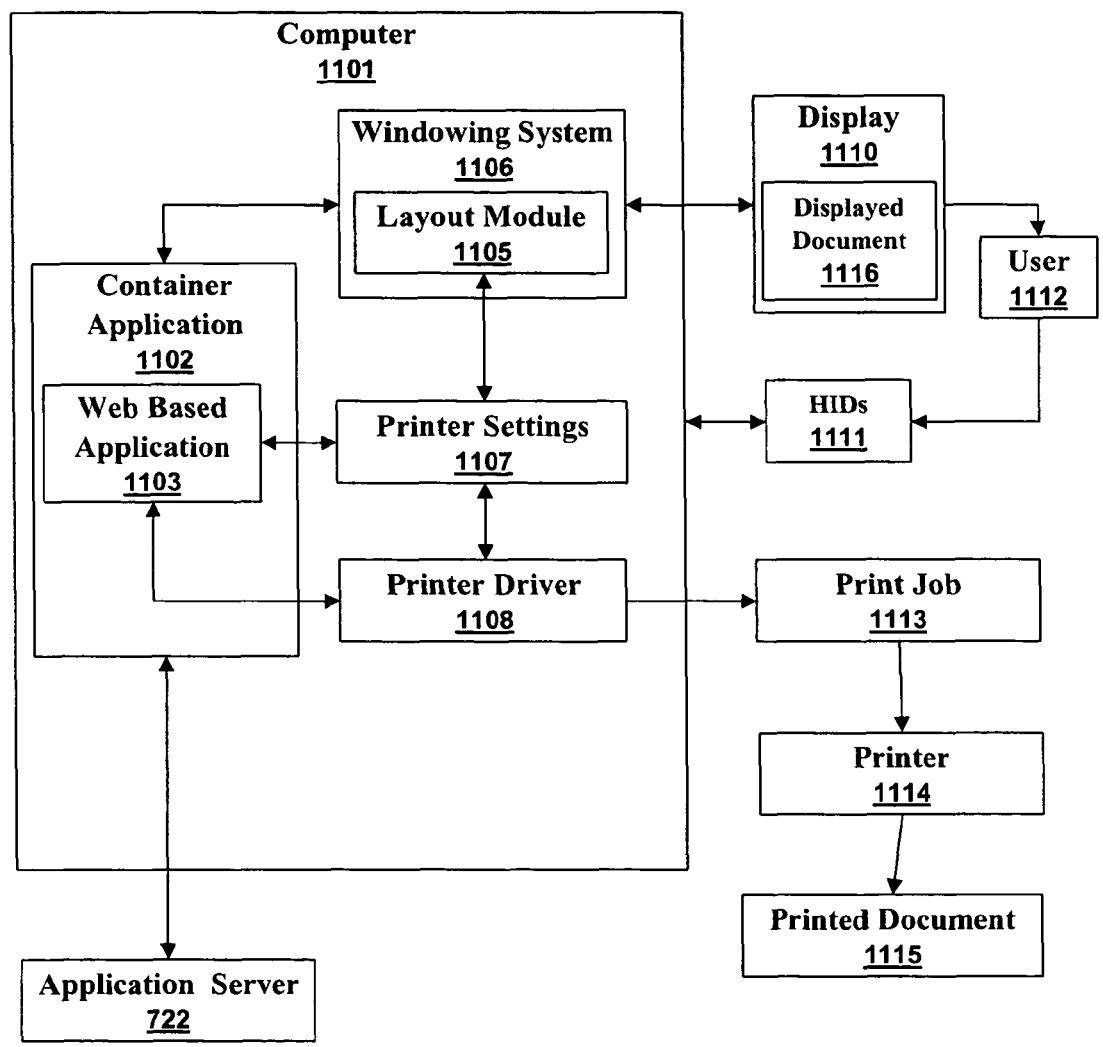
FIG. 11 illustrates a high level diagram of a web based application using printer settings to provide WYSIWYG capabilities in accordance with aspects of the embodiments.

FIG. 11 illustrates a high level diagram of a web based application 1103 using printer settings 1107 to provide "what you see is what you get" (WYSIWYG) type capabilities in accordance with aspects of the embodiments. A user 1112 can use a graphics workstation that is usually a computer 1101 with a windowing system 1106, display 1110, and human interface devices (HIDs) 1111. The windowing system 1106 uses a layout module 1105 to determine how to present a displayed document 1116 on a display 1110. The printer driver 1108 can be used to produce a print job 1113 that is passed to a printer 1114 to produce a printed document 1115.

A common problem is that the printed document and the displayed document appear different. For example, a web browser displays a page on the display, but when printed something else is obtained. For example, using the printer meta UI to print a web page often reveals that the web browser and printer treat every web page as a single page regardless of the number of pieces of paper required for the actual printing. WYSIWYG printing can ensure that the displayed document and the printed document appear substantially the same.

Printer settings 1107, which can be default values or settings corresponding to the printer 1114 can be used by the layout module 1105 to produce WYSIWYG results. Common printer settings are page size, margins, and printer resolution. WYSIWYG results can be improved by also using display settings such as the display resolution. A container application 1102 can run a web based application 1103 such that the web based application has access to the windowing system 1106, printer driver 1108, and printer settings 1107 and thereby has WYSISYG capability.

Figure 12:
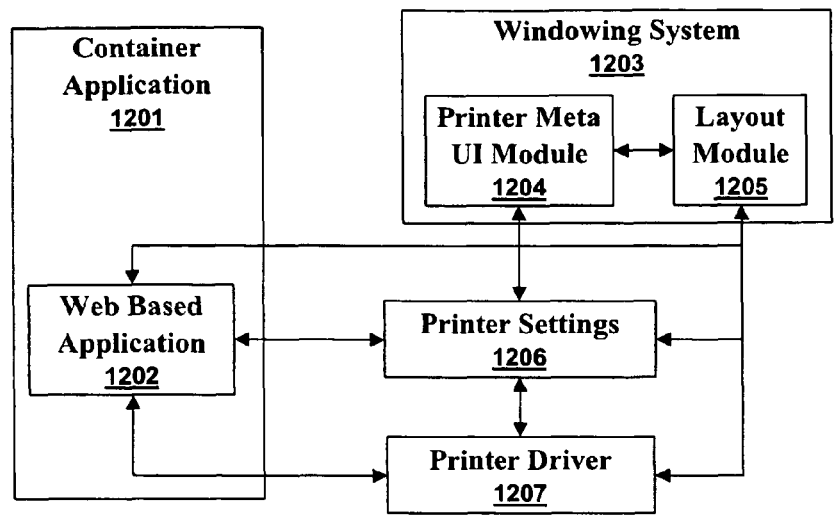
FIG. 12 illustrates a high level diagram of a web based application directly accessing printing services in accordance with aspects of the embodiments.

FIG. 12 illustrates a high level diagram of a web based application directly accessing printer services in accordance with aspects of the embodiments. A container application 1201 is running a web based application 1202 that has direct access to the printer settings 1206, printer driver 1207, printer meta UI module 1204, and layout module 1205. The printer meta UI module 1204 controls a printer meta UI through which printer settings such as page size, margins, and orientation can be changed.

Figure 13:
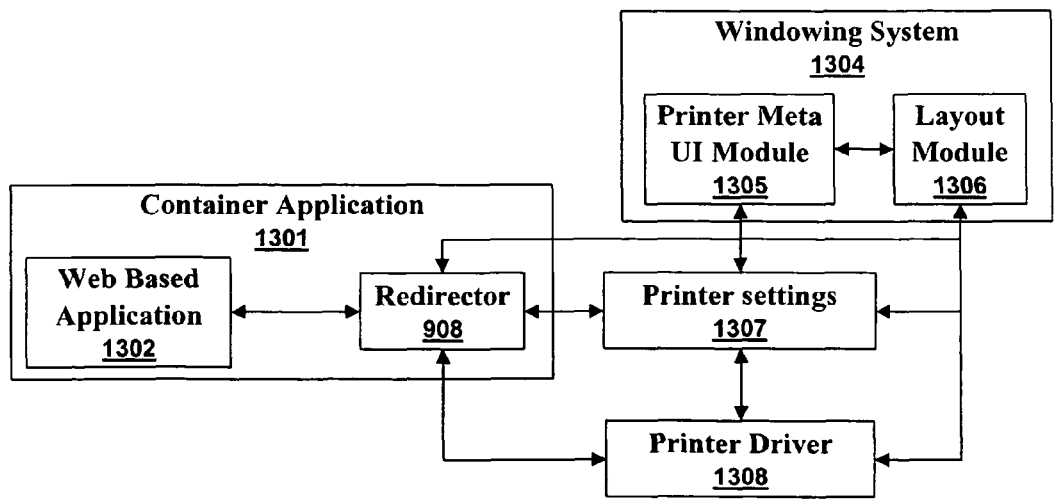
FIG. 13 illustrates a high level diagram of a web based application indirectly accessing printing services in accordance with aspects of the embodiments.

FIG. 13 illustrates a high level diagram of a web based application indirectly accessing printing services in accordance with aspects of the embodiments. FIG. 13 is similar to FIG. 12 with the exception that a redirector 908 is used. The redirector 908 functions similarly to that illustrated in FIG. 9.

WYSIWYG is just one of the capabilities available to a web based application that has access to printer settings, printer drivers, or the printer meta-UI module. In general, the web based application can format printed pages based on the printable area of the page, the available colors, etc. For example, a web based application can print headers, footers, on each page of a multi-page document. In contrast, a browser application cannot. A browser application is unable to determine how many pages the document will print as. As such, it cannot even determine the positioning of page breaks as is required for printing headers and footers. More specifically, a browser application lets the printer driver format pages whereas a web based application can format each page and instruct the printer driver to print those formatted pages.

Figure 14:
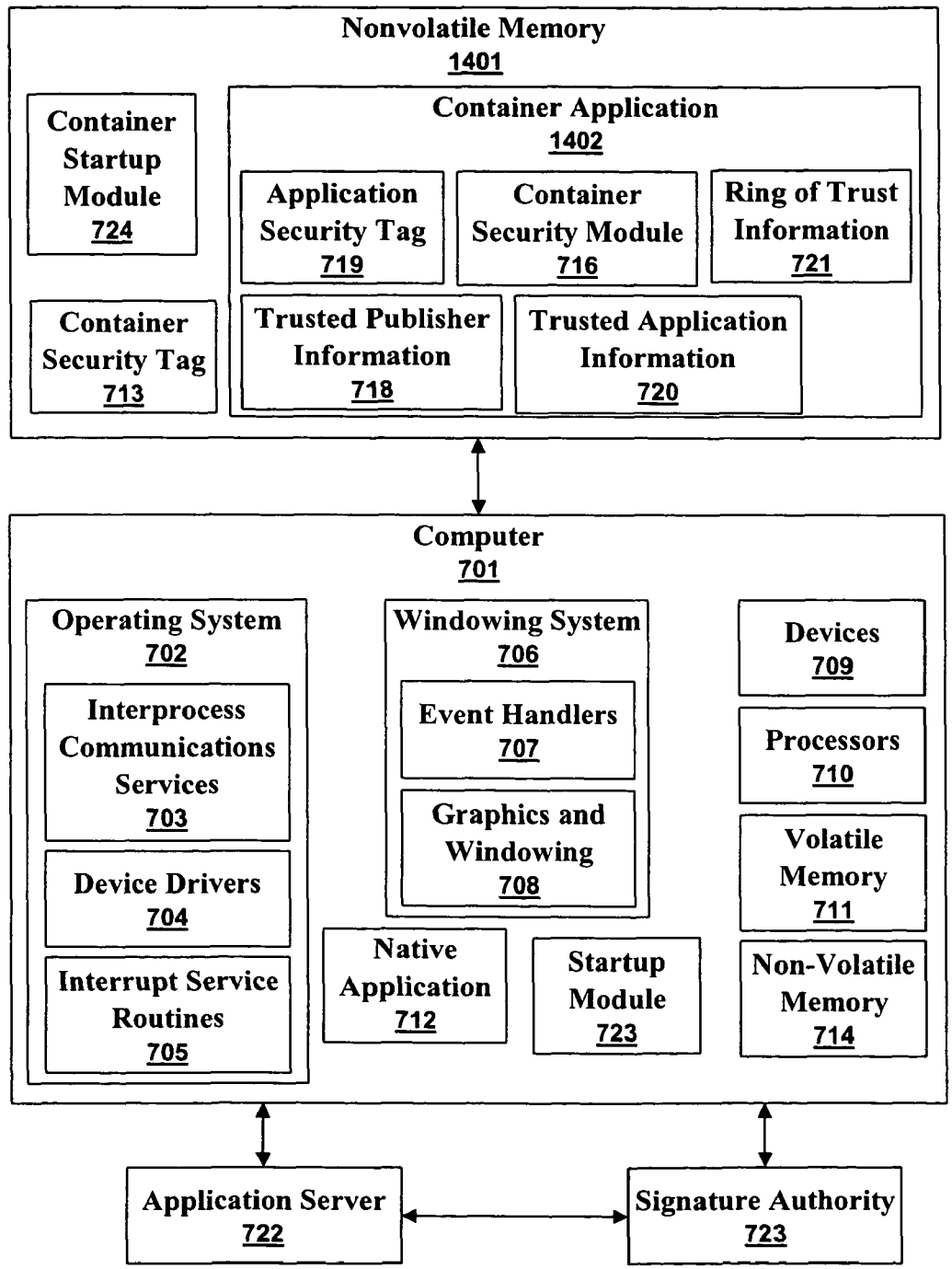
FIG. 14 illustrates a high level diagram of a computer running a container application from a non-volatile memory in accordance with aspects of the embodiments.

FIG. 14 illustrates a high level diagram of a computer 701 running a container application 1402 from a non-volatile memory 1401 in accordance with aspects of the embodiments. A non-volatile memory such as a flash memory device can store a container application 1402, container startup module 724, and container security tag 713. The container application 1402 can contain an application security tag 719, container security module 716, ring of trust information 721, trusted publisher information 718, and trusted application information 720.

Nonvolatile memory 1401 can be a pluggable non-volatile memory device, such as a USB key drive, that contains removable non-volatile memory. When the pluggable non-volatile memory is plugged into the computer 701, the operating system 702 can mount it. At that time the container startup module 724 can be executed to thereby launch the container application 1402 which can then automatically download and run a web based application from the application server 722. The computer 701 can be configured to automatically run the container startup module 724 when the pluggable non-volatile memory is plugged in. In general, a pluggable non-volatile memory device can be plugged into a running computer at which time the computer automatically recognizes and mounts the pluggable non-volatile memory device such that the memory in the device can be accessed.

Figure 15:
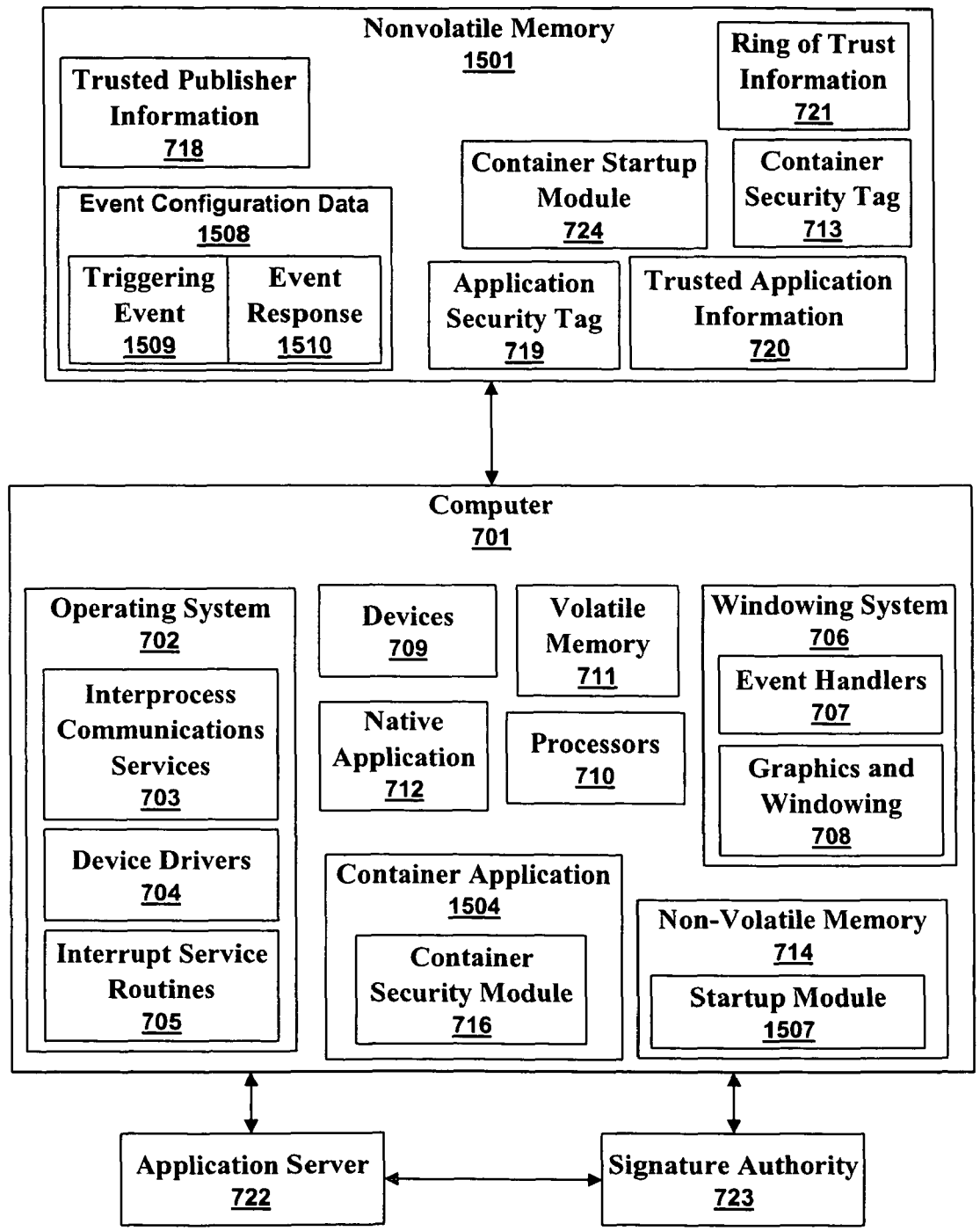
FIG. 15 illustrates a high level diagram of a computer running a container application based on a container startup module stored in a non-volatile memory in accordance with aspects of the embodiments.

FIG. 15 illustrates a high level diagram of a computer 701 running a container application 1504 based on a container startup module 724 stored in a non-volatile memory 1501 in accordance with aspects of the embodiments. One difference between FIG. 14 and FIG. 15 is that the container application 1504 is stored on the computer 701 while the non-volatile memory 1501 can contain the container startup module 724, application security tag 719, ring of trust information 721, container security tag 713, trusted publisher information 718, and trusted application information 720. The container startup module 724 can launch the container application 1504 that can then access the modules and data on the non-volatile memory device.

FIG. 15 also illustrates event configuration data 1508 stored in the non-volatile memory 1501. Event configuration data 1508 includes associations between triggering events 1509 and event responses 1510 and can be stored in the non-volatile memory, as shown, in the computer 701, or both. Plugging the non-volatile memory into the computer is an example of a triggering event and launching the container application is an example of an event response. An event response is performed on the occurrence of an associated triggering event.

A second example of a triggering event is a user connecting to the Internet with event responses including launching a container application, launching a web based photo album application within the container application, and uploading images to the server. A third example is the user clicking on a page scanner's scan button, where the scanner can be a peripheral device or a network appliance. Example event responses can include a container application launching and running a scanner specific web based application such as a text recognizer or an image manipulator. A fourth example is a user clicking an email hot button on a keyboard as the triggering event for launching a container application that then runs a web based email application. A fifth example is running a web based remote backup application inside a container application in response to writing a file to an automatic backup directory. A sixth example is running a web based payment application inside a container application in response to the user visiting a web page that requires payment. Many other events can be triggering applications, such as system startup or shut down.

Figure 23:
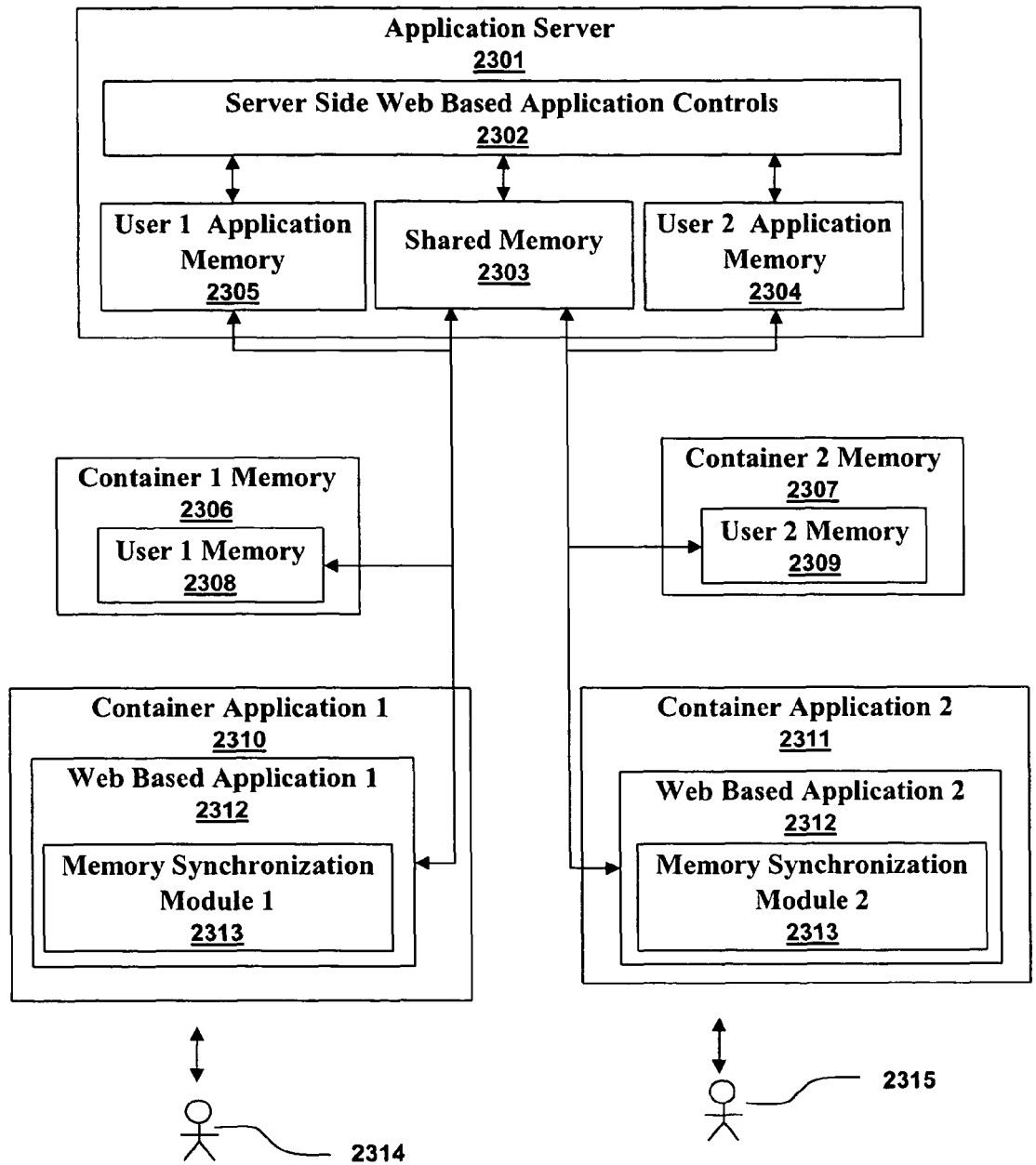
FIG. 23 illustrates a high level diagram of collaborative web based application containing a memory synchronization module in accordance with aspects of some embodiments.

FIG. 23 illustrates a high level diagram of collaborative web based application 2312 containing a memory synchronization module 2313. An application server 2301 provides the web based application 2312 to container application 1 2310 and container application 2 2311. User 1 2314 is using the web based application 2312 in container application 1 2310 and has a user 1 memory area 2308 in the container 1 memory 2306. User 2 2315 is using the web based application 2312 in container application 2 2311 and has a user 2 memory area 2309 in the container 2 memory 2307. The application server 2301 has server side web based application controls 2302 that can interact with the web based application 2312.

As user 1 2314 uses the web based application 2312, data stored in the user 1 application memory 2305 can be changed by the server side web based application controls 2302 and by the web based application running in container application 1 2310. If the web based application 2312 uses local non-volatile memory, such as the user 1 memory 2308, the memory synchronization module 2313 can ensure that the user 1 application memory 2305 and the user 1 memory 2308 are coherent or synchronized. The web based application 2312 is not collaborative if the actions of user 1 2314 and the web based application 2312 running in container application 1 2310 do not effect the shared application memory 2303, the user 2 application memory 2304, or the user 2 memory 2309.

The web based application 2312 is collaborative if the actions of user 1 2314 and the web based application 2312 running in container application 1 2310 can effect the shared application memory 2303, the user 2 application memory 2304, or the user 2 memory 2309. Similarly, the actions of user 2 2315 and the web based application 2312 running in container application 2 2311 can effect the shared application memory 2303, the user 1 application memory 2305, or the user 1 memory 2308. The various memories are synchronized or kept coherent by the memory synchronization module 2313.

For simplicity, the user 1 application memory 2305, user 2 application memory 2304, and shared application memory 2303 are illustrated as being within the application server 2301. In practice, they can be within a completely different server, called a memory server. Alternatively, many different memory servers can be used with the various server side memories distributed amongst them.

The shared memory module 2303 can be accessed by either user 1 2314 or user 2 2315. Additional users can also access the shared memory module 2303 although security modules, as discussed above, can limit access to any one particular shared memory module to a certain group of users. As such many different shared memory modules can correspond to many different groups of users.

As discussed above, access to user memories can be restricted by security modules. As such, only user 2 or the web based application 2312 running in container application 2 2311 might be able to access the user 2 memory 2309 or user 2 application memory 2304. The memory synchronization module 2313 can ensure that the memories for the various users are coherent.

Some web based applications do not require memory on the application server such as the user 1 application memory 2305, the user 2 application memory 2304, or the shared application memory 2303. Such applications can collaborate when the memory synchronization modules 2313 running in different container applications 2310, 2311 can keep the user memories 2308, 2309 synchronized or coherent. Such web based applications can be called peer to peer web based applications.

Figure 24:
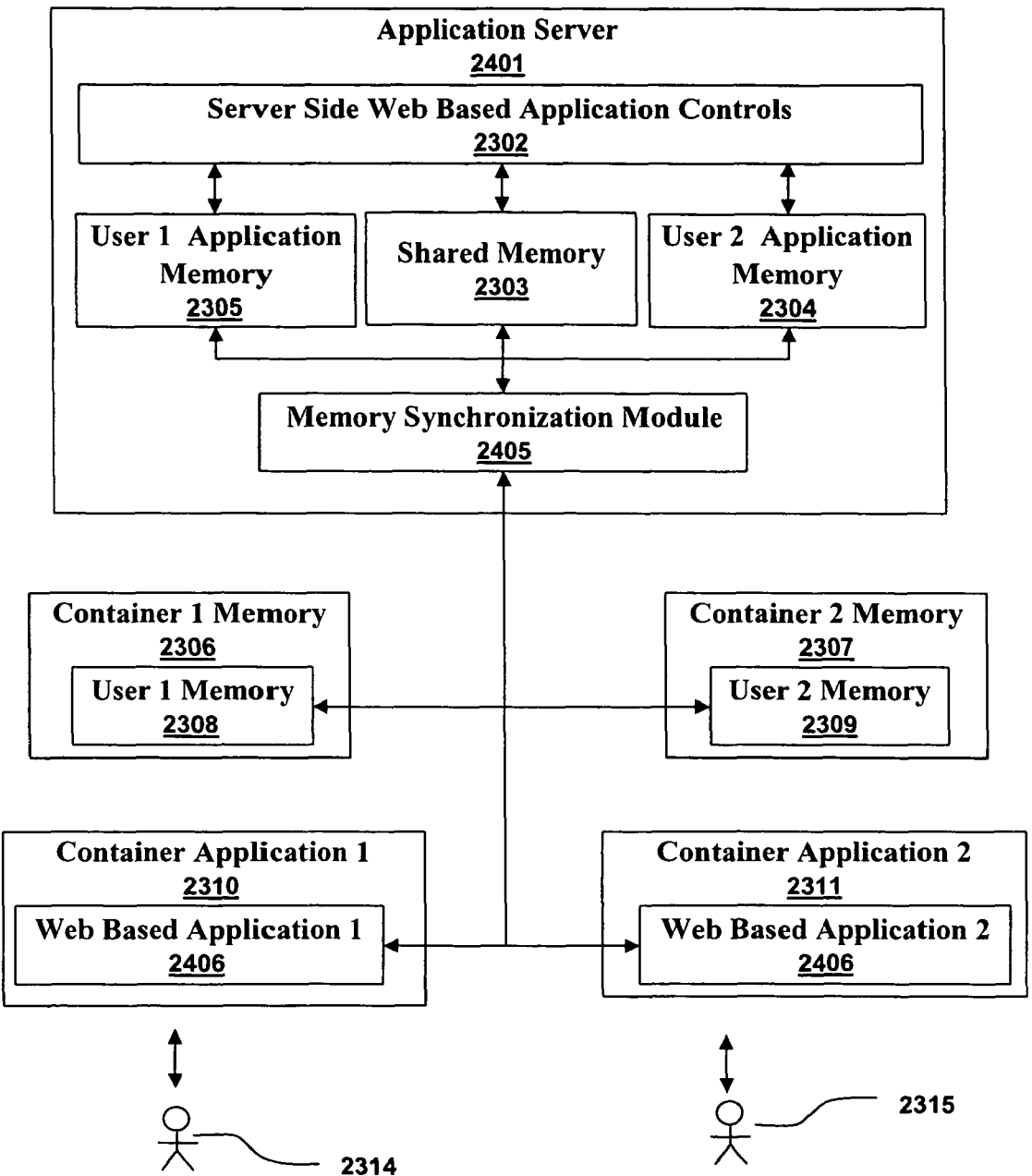
FIG. 24 illustrates a high level diagram of collaborative web based application with a server side memory synchronization module in accordance with aspects of some embodiments.

FIG. 24 illustrates a high level diagram of collaborative web based application 2406 with a server side memory synchronization module 2405. FIG. 24 differs from FIG. 23 in having a memory synchronization module illustrated as being within the application server 2401 instead of within the web based application 2406. In practice, a memory synchronization module can run in a completely different server called a memory synchronization server. As such, FIG. 23 illustrates a decentralized memory synchronization scheme while FIG. 24 illustrates a centralized memory synchronization scheme.

Memory coherence and memory synchronization are well known concepts within the computing arts. Those skilled in the arts of distributed processing, computer architecture, distributed databases, or distributed data storage know of many systems and methods for keeping different memories synchronized or coherent. Coherence means that the data in one memory does not disagree with that in another memory. Synchronization means that the same data is stored in the memories. Essentially, synchronization is a type of coherence.

Applications, including web based applications, can be instances of fundamental applications. For example, the Firefox web browser is a fundamental application. More specifically, different versions of the Firefox web browser are different fundamental applications. Many people can concurrently use different instances of the same fundamental application. For example, two different users on two different computers can run two different instances of the latest version of Firefox.

As discussed above, two web based application can collaborate by sharing information. The collaborating web based applications can be different instances of the same fundamental web based application or can be instances of different fundamental web based applications.

If a window is associated with a container application, then a web based application can display content in the content area of that window. The content can be obtained from a user, from the application server, from a container memory, or from a content server. The content itself can be a document. Documents can be one or many pages. Documents can be fillable forms. Multiple documents can also be presented within the content area with separate documents presented in overlapping windows, tabbed windows, or one of the other ways that are used for presenting multiple documents on a desktop.

In some embodiments, the container application is a native application that is run by the operating system similarly to any other native application. Native programs, however also can be integrated into an operating system and become part of the operating system. For example, some operating systems contain a windowing system, and some operating systems contain web browsers. As such, it is consistent with the embodiments that operating systems can contain windowing systems, container applications, or other applications. The architectural position of modules as either within the operating system or within native applications is somewhat arbitrary and therefore, the various positions are equivalent with respect to the embodiments.

High Level Process Flow

Figure 16:
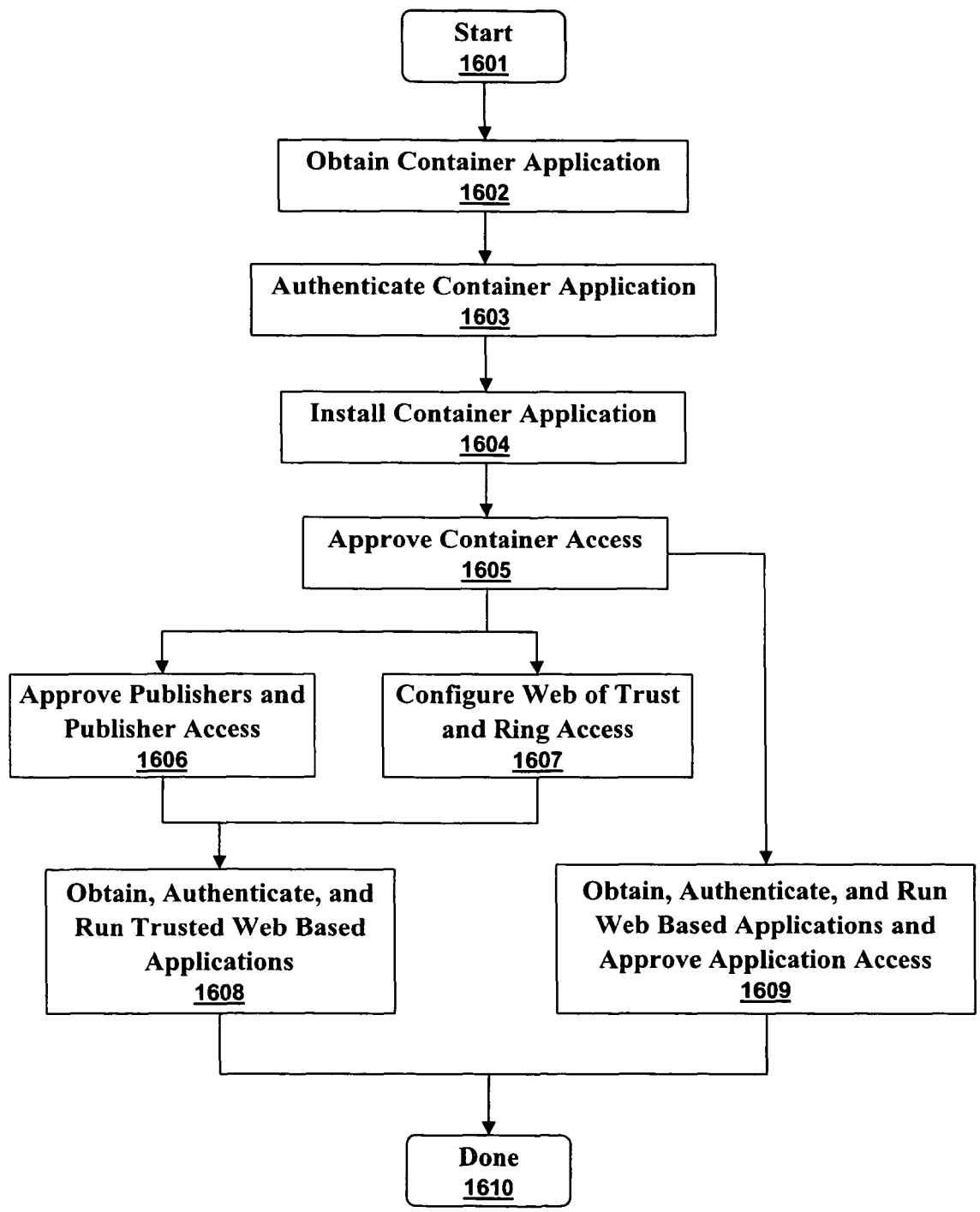
FIG. 16 illustrates a high level flow diagram of running authenticated and secure web based applications in accordance with aspects of the embodiments.

FIG. 16 illustrates a high level flow diagram of running authenticated and secure web based applications in accordance with aspects of the embodiments. After the start 1601, a container application is obtained 1602, authenticated 1603, and installed 1604. Next, container access is approved 1605, meaning that the container application's ability to access certain system and windowing system resources is restricted as appropriate. Most operating systems have systems and methods for restricting the access of applications and users. After the container's access is approved 1605, web based applications can be obtained, authenticated and run with selective access to resources 1609. Also after approving container access 1605, publishers can be approved and given selective access to resources 1606. A web of trust can also be set up 1607 before trusted web based applications are obtained, authenticated, and run 1608.

Figure 17:
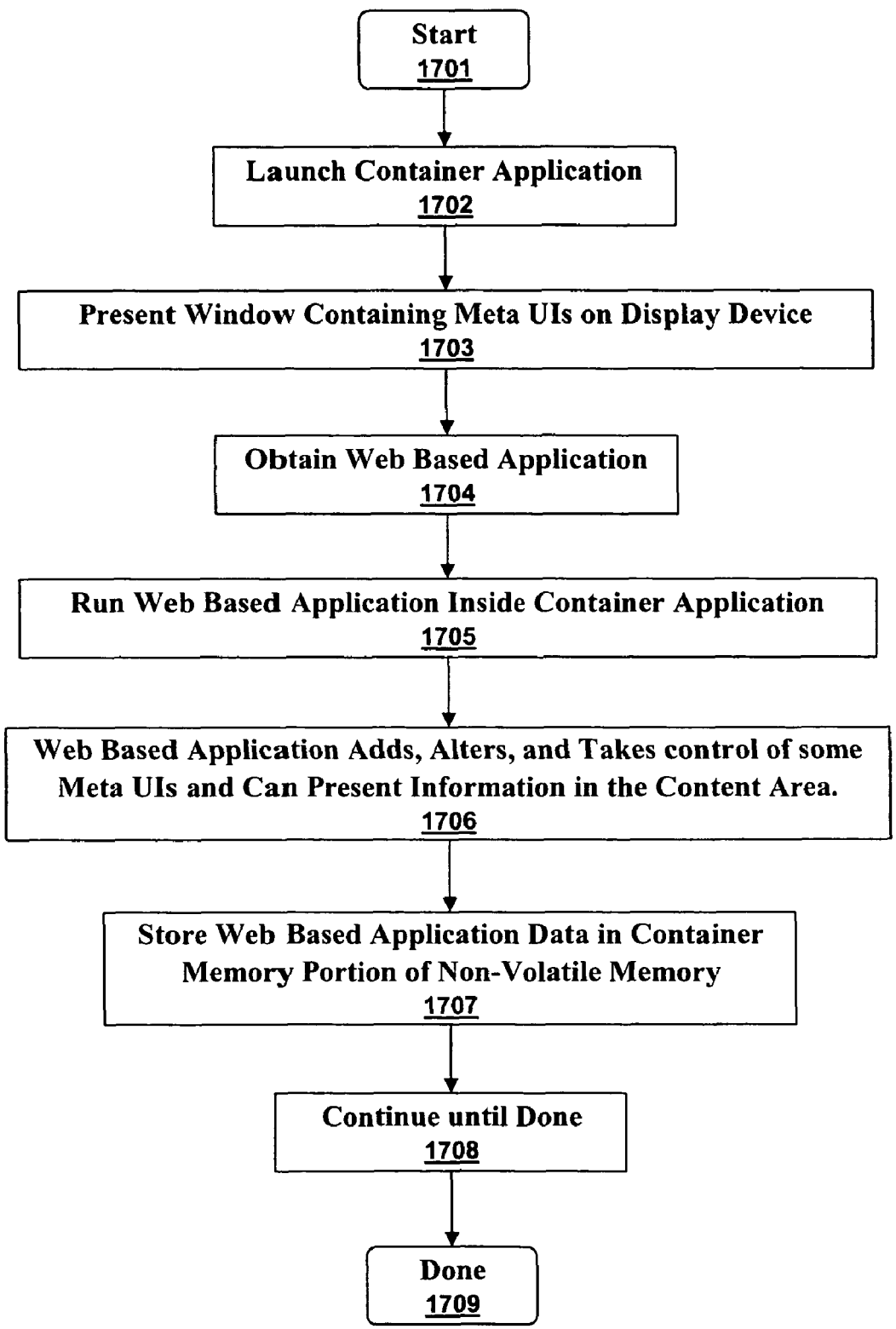
FIG. 17 illustrates a high level flow diagram of running a web based application in accordance with aspects of the embodiments.

FIG. 17 illustrates a high level flow diagram of running a web based application in accordance with aspects of the embodiments. After the start 1701, a container application is launched 1702. A window containing meta UIs and associated with the container application is then presented on a display device 1703. Next, a web based application is obtained 1704 and run within the container application 1705. The web based application then adds meta UIs, alters existing meta UIs, or otherwise controls meta UIs 1706. The web based application then accesses and stores data in a container memory 1707. As part of a non-volatile memory, the container memory is non-volatile. The web based application is then run until it stops or is stopped 1708.

Figure 18:
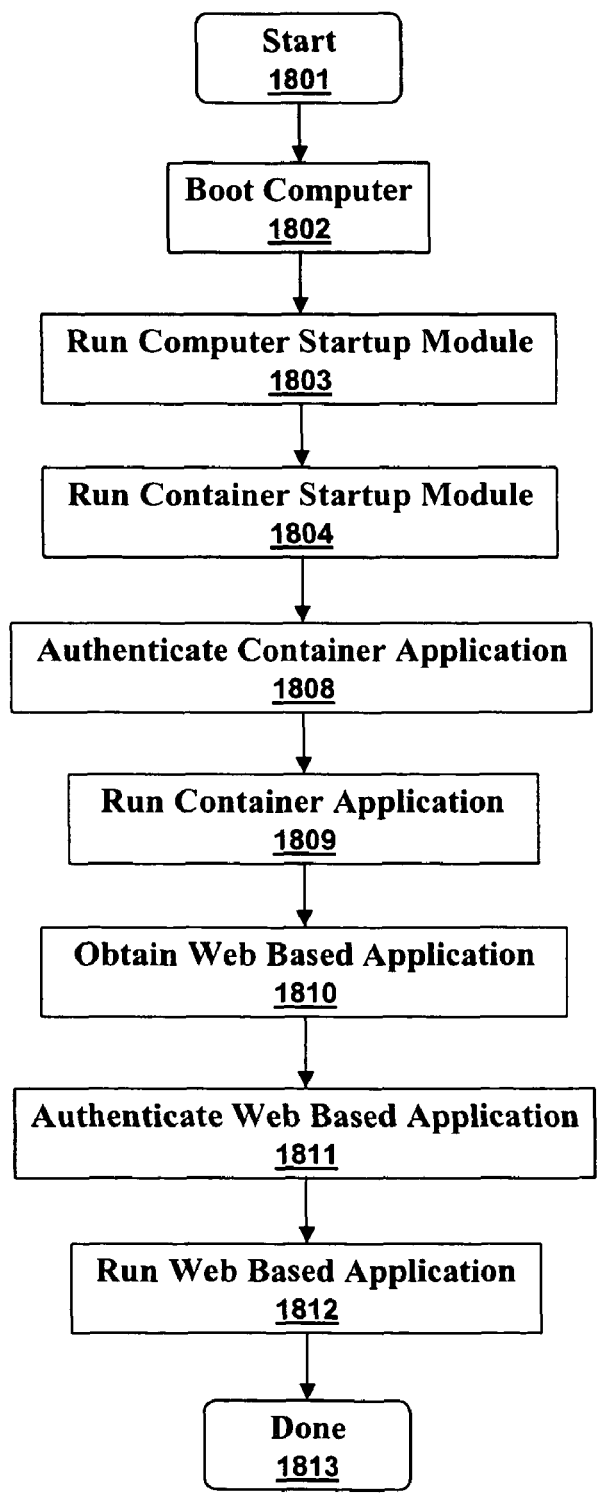
FIG. 18 illustrates a high level flow diagram of using a startup module and a container startup module in accordance with aspects of the embodiments.

FIG. 18 illustrates a high level block diagram of using a startup module and a container startup module in accordance with aspects of the embodiments. After the start 1801, the computer is booted 1802 and the computer startup module is run 1803. Next, the container startup module is run 1804. The container startup module can be automatically launched by the computer startup module. The container application can be authenticated 1808 before being run 1809. The container application is then used to obtain a web based application 1810, authenticate it 1811, and run it 1812 until done 1813.

Figure 19:
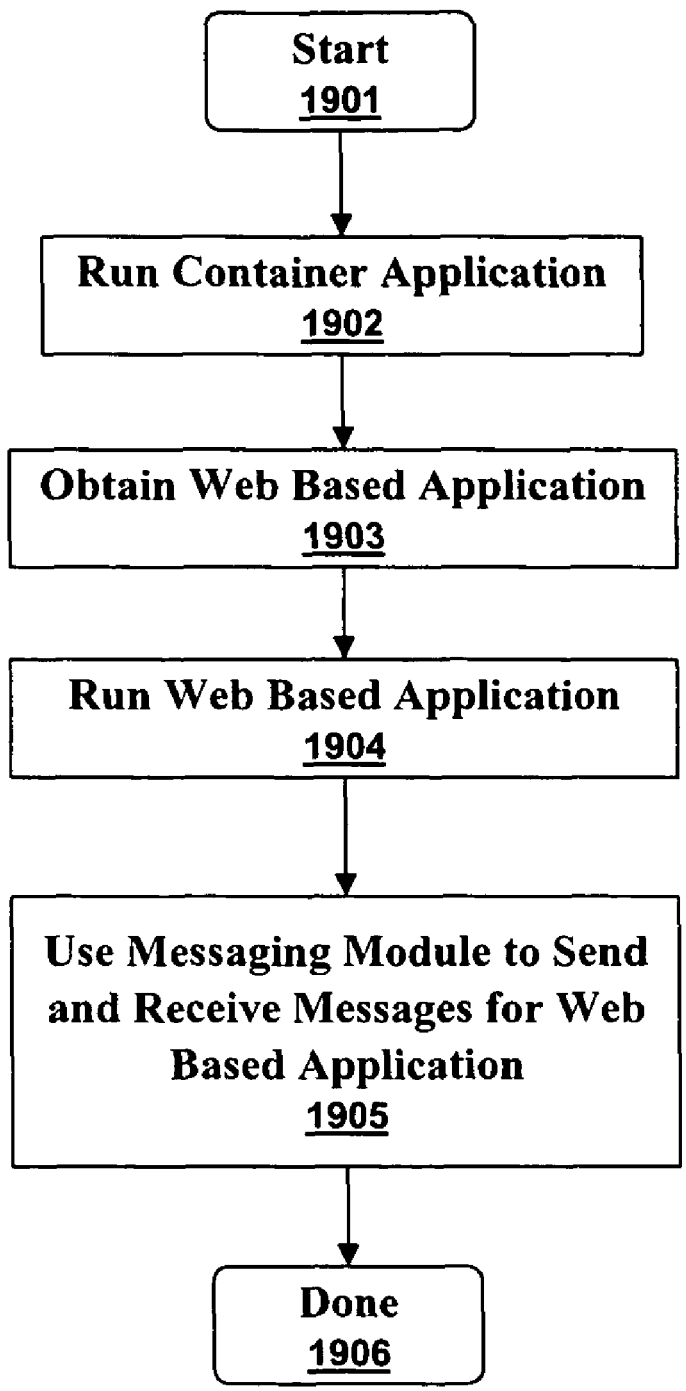
FIG. 19 illustrates a high level flow diagram of using a messaging module in accordance with aspects of the embodiments.

FIG. 19 illustrates a high level flow diagram of using a messaging module in accordance with aspects of the embodiments. After the start 1901, a container application is run 1902 and then used to obtain a web based application 1903 and run it 1904. A messaging module can then be used by the web based application to send and receive messages 1905. The web based application can use a messaging module to share data with other web based applications, native applications, the windowing system, the operating system, or processes running on a separate computer.

Figure 20:
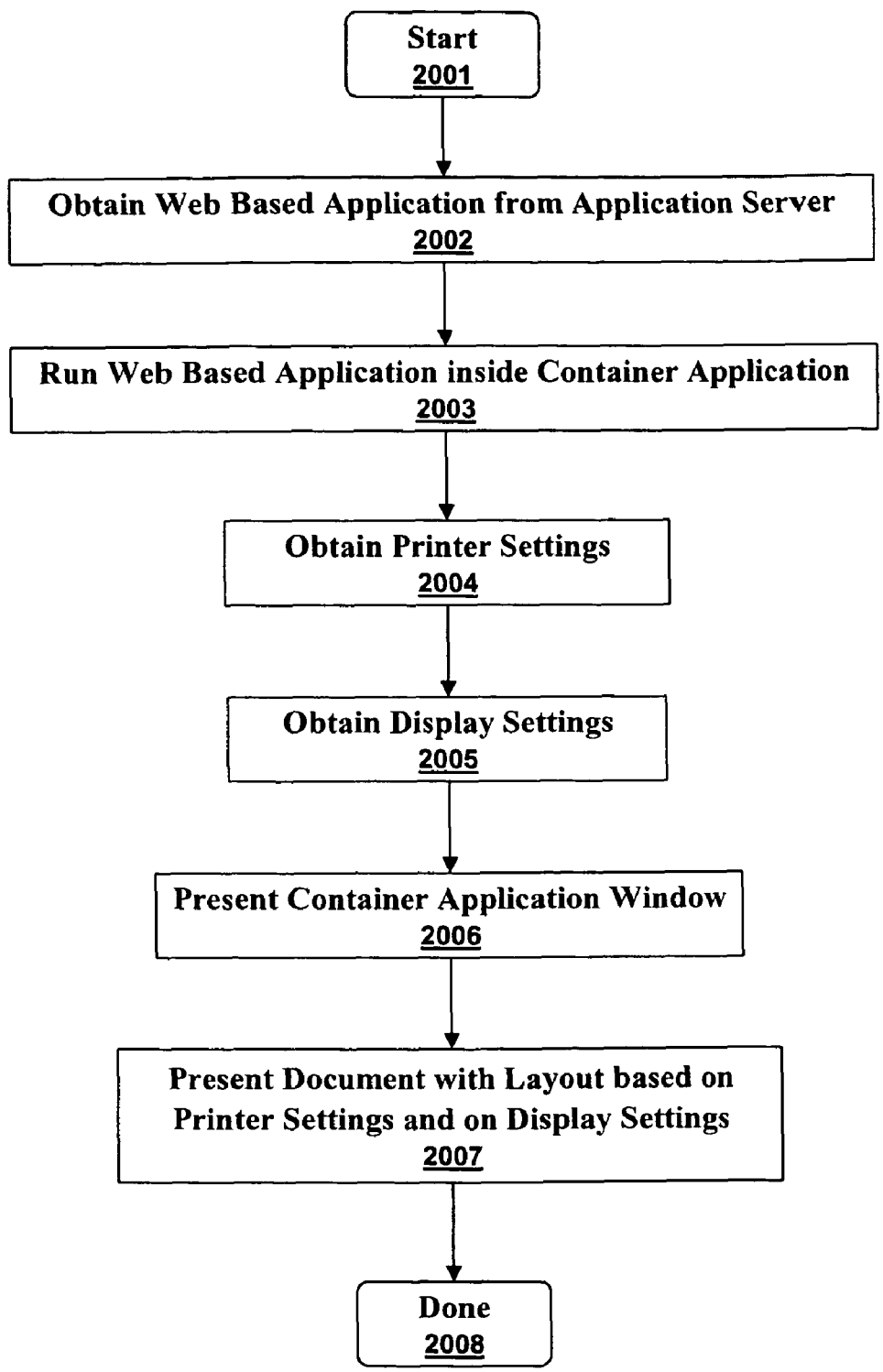
FIG. 20 illustrates a high level flow diagram of using a printer settings and display settings in accordance with aspects of the embodiments.

FIG. 20 illustrates a high level flow diagram of using printer settings and display settings in accordance with aspects of the embodiments. After the start 2001 a container application is used to obtain a web based application from an application server 2002. The web based application is run inside the container application 2003 and obtains printer settings 2004 and display settings 2005. A container application window is opened 2006 on the display. A display document is presented in the container window with a layout based on the printer settings and the display settings 2007 thereby presenting a WYSIWYG display document.

Figure 21:
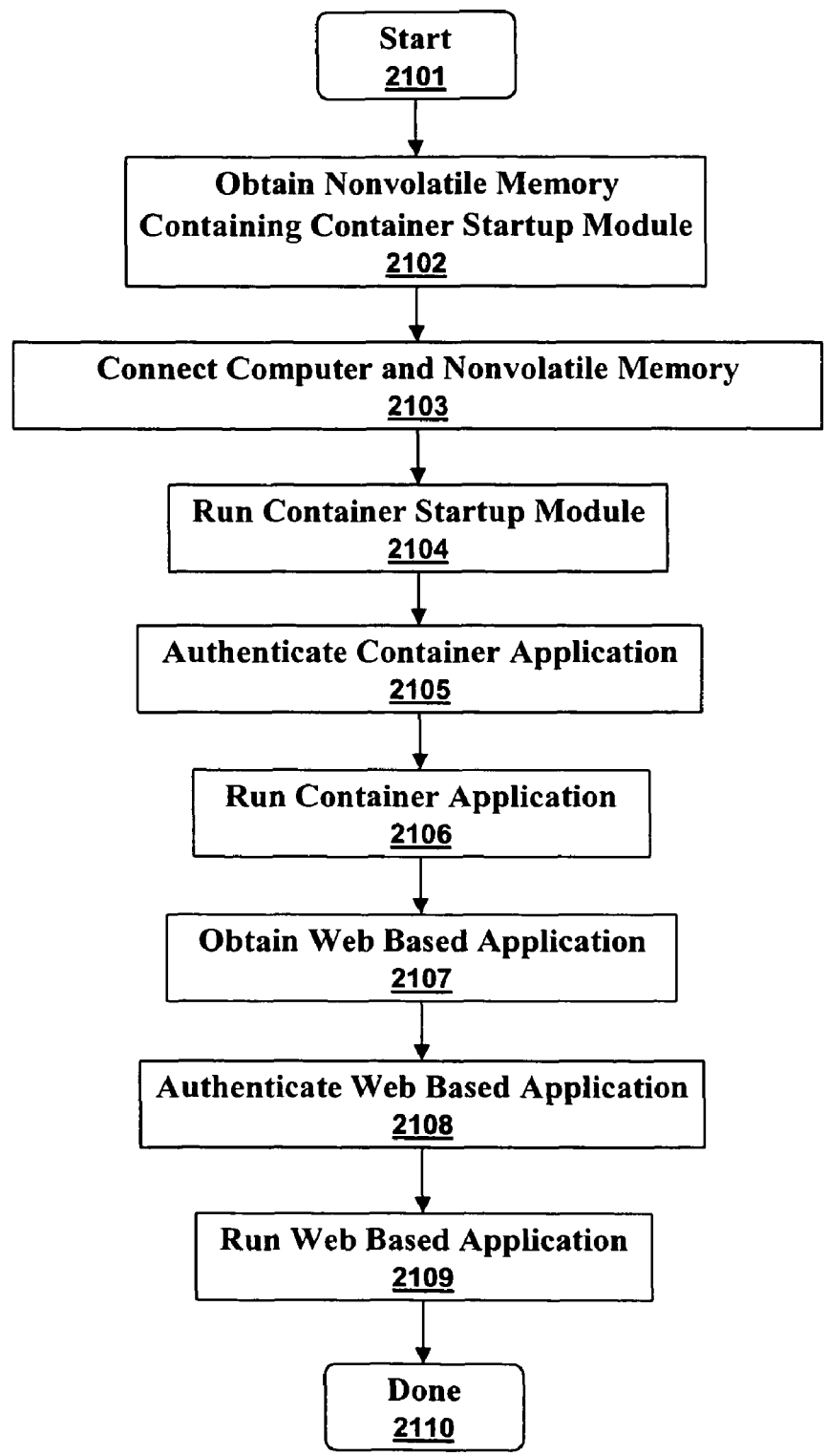
FIG. 21 illustrates a high level flow diagram of using a pluggable non-volatile memory to run a container application in accordance with aspects of the embodiments.

FIG. 21 illustrates a high level flow diagram of using a pluggable non-volatile memory to run a container application in accordance with aspects of the embodiments. After the start 2101, a non-volatile memory containing a container startup module is obtained 2102. The non-volatile memory is plugged into the computer 2103 and the container startup module is run 2104. The container application is authenticated 2105 and then run 2106. The container application is used to obtain a web based application 2107 that is then authenticated 2108 and run 2109.

Figure 25:
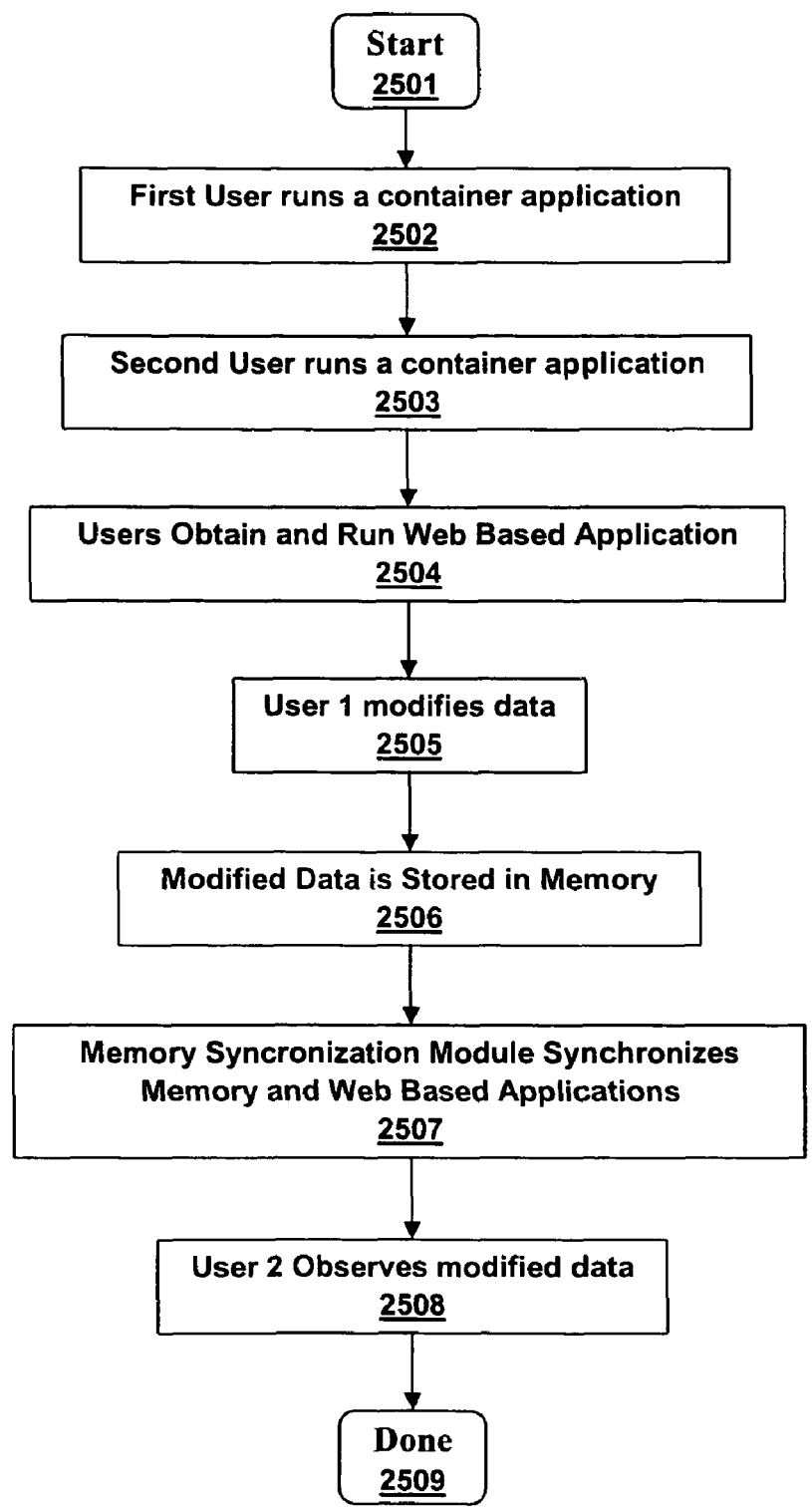
FIG. 25 illustrates a high level flow diagram of a collaborative web based application in accordance with aspects of some embodiments.

FIG. 25 illustrates a high level flow diagram of a collaborative web based application in accordance with aspects of some embodiments. After the start 2501 a first user runs a container application 2502. A second user also runs a container application 2503. Both users obtain and run a web based application 2504. User 1 uses modifies data 2505 which is then stored in a memory 2506. The memory synchronization module synchronizes the memory and the web based applications 2507 such that the second user can observe the modified data 2508. Clearly, the second user can also modify data with the first user observing those modifications. Note that both users do not need to run the same web based application, they only need use web based applications that have the ability to interact and share information.

Modern operating systems and windowing systems use a number of techniques to provide native applications with access to resources and services. All of those techniques, whether based on system calls, message passing, or anything else are performed by, at some level, accessing an entry point. An entry point is a specific point where access to a resource or service can be obtained.

General

Embodiments can be implemented in the context of modules. In the computer programming arts, a module (e.g., a software module) can be implemented as a collection of routines and data structures that perform particular tasks or implement a particular abstract data type. Modules generally can be composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment", "some embodiments", or "certain embodiments" do not necessarily refer to the same embodiment or any specific embodiment.

It will be appreciated that various of the above-disclosed and other features and functions, or alternatives thereof, may be desirably combined into many other different systems or applications. Also that various alternatives, modifications, variations or improvements therein may be made by those skilled in the art and are also encompassed by the following claims.

What is claimed is:

1. A system comprising:
   a first computer; and
   an application server running on the first computer that serves a web based application to a container application running on a second computer separate from the first computer,
   wherein the web based application, served from the first computer, lays out web based application content in conformance with at least one printer setting associated with a printer driver installed on the second computer, wherein the web based application content is received from a content server;
   wherein the web based application uses the container application to access at least one printer setting, the at least one print setting comprising a printer resolution and specifying a printer font;
   wherein a window comprising a content area includes a displayed document comprising the web based application content; and
   wherein the displayed document is laid out in conformance with a display resolution and with the printer resolution.

2. The system of claim 1, wherein the web based application has direct access to the at least one printer setting.

3. The system of claim 1, wherein the web based application has redirected access to the at least one printer setting.

4. A system comprising:
   a first computer; and
   an application server running on the first computer that serves a web based application to a container application running on a second computer;
   wherein the web based application obtains a web based application content from a content server;
   wherein the web based application uses a layout module to produce a displayed document from the web based application content;
   wherein a window comprising a meta UI area and a content area displays the displayed document within the content area;
   wherein the displayed document is laid out in conformance with at least one printer setting associated with a printer, the at least one printer setting comprising a print resolution and specifying a printer font and in conformance with a display resolution;
   wherein a user can use a printer meta UI to instruct the printer to print the web based application content as a printed document; and
   wherein the at least one printer setting is used to cause the printed document to be laid out the same as the displayed document.

5. The system of claim 4, wherein the layout module is used to lay out the printed document such that the printed document and the displayed document appear the same.

6. The system of claim 4:
   wherein the computer comprises a non-volatile memory; and
   wherein the web based application obtains the web based application content from the non-volatile memory.

7. The system of claim 4, wherein the web based application has redirected access to the at least one printer setting.

8. The system of claim 4, wherein the displayed document is laid out in conformance with at least one display resolution.

9. The system of claim 4:
   wherein the web based application has redirected access to the at least one printer setting.

10. A computer-implemented method comprising:
    serving a web based application from an application server wherein the web based application runs inside a container application;
    wherein the web based application uses the container application to access at least one printer setting, the at least one printer setting comprising a printer resolution and printer font;
    wherein the window comprises a content area and a meta UI area;
    presenting a displayed document within the content area and laying out the displayed document in conformance with a display resolution and the printer resolution.

11. The method of claim 10, wherein the printed document and the displayed document appear the same.

12. The method of claim 10, wherein a user selecting a meta UI control causes a printer meta UI comprising at least one page layout control to be presented to the user.

13. The method of claim 10:
    wherein a window is associated with the container application and comprises a content area and a meta UI area;
    wherein the displayed document comprising the web based application content is presented within the content area;
    wherein a user selecting a meta UI control causes a printer meta UI comprising at least one page layout control to be presented to the user; and
    wherein the displayed document and the printed document appear the same.

* * * * *